United States Patent
Okanishi et al.

(10) Patent No.: US 8,691,471 B2
(45) Date of Patent: Apr. 8, 2014

(54) POLYMER ELECTROLYTE FUEL CELL AND FUEL CELL STACK COMPRISING THE SAME

(75) Inventors: Takeou Okanishi, Nara (JP); Naotsugu Koashi, Kyoto (JP); Shinsuke Takeguchi, Osaka (JP); Yoichiro Tsuji, Osaka (JP)

(73) Assignee: Panasonic Corporation, Osaka (JP)

( * ) Notice: Subject to any disclaimer, the term of this patent is extended or adjusted under 35 U.S.C. 154(b) by 342 days.

(21) Appl. No.: 13/063,353

(22) PCT Filed: Sep. 11, 2009

(86) PCT No.: PCT/JP2009/004518
§ 371 (c)(1),
(2), (4) Date: Mar. 10, 2011

(87) PCT Pub. No.: WO2010/029758
PCT Pub. Date: Mar. 18, 2010

(65) Prior Publication Data
US 2011/0165493 A1    Jul. 7, 2011

(30) Foreign Application Priority Data
Sep. 12, 2008    (JP) .................................. 2008-234829

(51) Int. Cl.
*H01M 8/04*    (2006.01)
(52) U.S. Cl.
USPC ............ 429/514; 429/512; 429/513; 429/457
(58) Field of Classification Search
USPC ................................ 429/512, 513, 514, 457
See application file for complete search history.

(56) References Cited

U.S. PATENT DOCUMENTS

| 2003/0157387 A1 | 8/2003 | Hase et al. |
| 2004/0180248 A1 | 9/2004 | Matsubayashi et al. |

(Continued)

FOREIGN PATENT DOCUMENTS

| JP | 62-90871 | 4/1987 |
| JP | 09-283162 | 10/1997 |

(Continued)

OTHER PUBLICATIONS

Extended European Search Report dated Dec. 19, 2012 issued in corresponding EP Patent Application No. 09812907.5.

(Continued)

*Primary Examiner* — Milton I Cano
*Assistant Examiner* — Jeremiah Smith
(74) *Attorney, Agent, or Firm* — McDermott Will & Emery LLP

(57) ABSTRACT

A polymer electrolyte fuel cell of the present invention includes a membrane electrode assembly (5) having a pair of electrodes (4a, 4b) sandwiching a portion of a polymer electrolyte membrane (1) which is inward relative to a peripheral portion thereof, a first separator (6a), and a second separator (6b), the first separator (6a) is provided with a first reaction gas channel (8) on one main surface, the second separator (6b) is provided with a second reaction gas channel (9) on one main surface such that the second reaction gas channel (9) has a second rib portion (12), the first reaction gas channel (8) is formed such that a ratio of a first reaction gas channel width of an upstream portion (18b) to the second rib portion (12) is set larger than a ratio of a first reaction gas channel width of a downstream portion (18c) to the second rib portion (12), and the ratio of the first reaction gas channel width of the upstream portion (18b) to the second rib portion (12) is a predetermined ratio.

14 Claims, 30 Drawing Sheets

(56) References Cited

U.S. PATENT DOCUMENTS

| | | |
|---|---|---|
| 2007/0087257 A1 | 4/2007 | Son et al. |
| 2009/0029228 A1 | 1/2009 | Shibata et al. |
| 2009/0162717 A1 | 6/2009 | Nakagawa et al. |
| 2012/0040268 A1* | 2/2012 | Okanishi et al. ............ 429/480 |

FOREIGN PATENT DOCUMENTS

| | | |
|---|---|---|
| JP | 11-16590 | 1/1999 |
| JP | 2001-085033 | 3/2001 |
| JP | 2003-092121 A | 3/2003 |
| JP | 2003-297395 | 10/2003 |
| JP | 2004-185934 | 7/2004 |
| JP | 2004-342442 | 12/2004 |
| JP | 2005-235418 | 9/2005 |
| JP | 2005-276736 | 10/2005 |
| JP | 2005-285682 A | 10/2005 |
| JP | 2006-331916 | 12/2006 |
| JP | 2008-047293 | 2/2008 |
| JP | 2008-091104 | 4/2008 |
| JP | 2008-112738 A | 5/2008 |
| WO | WO-2005/057697 A2 | 6/2005 |
| WO | WO 2007/088832 A1 | 8/2007 |
| WO | WO 2007/148761 A1 | 12/2007 |
| WO | WO-2008/041994 A1 | 4/2008 |

OTHER PUBLICATIONS

"Development and Material of Fuel Cell," May 31, 2002, p. 87, with English translation, 5 pages.

"Explanation Fuel Cell System—Binding of Polymer electrolyte Fuel Cell—Bipolar plate," Oct. 28, 2014, vol. 1, p. 119, with English translation, 5 pages.

Japanese Office Action issued in Japanese Application No. 2010-528653 dated Oct. 22, 2013, 6 pages.

* cited by examiner

POLYMER ELECTROLYTE FUEL CELL AND FUEL CELL STACK COMPRISING THE SAME

RELATED APPLICATIONS

This application is the U.S. National Phase under 35 U.S.C. §371 of International Application No. PCT/JP2009/004518 filed on Sep. 11, 2009, which in turn claims the benefit of Japanese Application No. 2008-234829, filed on Sep. 12, 2008, the disclosures of which Applications are incorporated by reference herein.

TECHNICAL FIELD

The present invention relates to a configuration of a polymer electrolyte fuel cell and a configuration of a fuel cell stack comprising the polymer electrolyte fuel cell. Particularly, the present invention relates to a configuration of a separator of the polymer electrolyte fuel cell.

BACKGROUND ART

In recent years, as a clean energy source, fuel cells have attracted attention. As the fuel cells, for example, there is a polymer electrolyte fuel cell. The polymer electrolyte fuel cell (hereinafter referred to as PEFC) includes a membrane-electrode assembly, and an anode separator and a cathode separator which sandwich the membrane-electrode assembly and are disposed in contact with an anode and a cathode, respectively. The membrane-electrode assembly includes the anode and the cathode (these are referred to as electrodes) each composed of a gas diffusion layer and a catalyst layer. Each gas diffusion layer has pores forming paths through which a reaction gas flows. The anode separator is provided with a fuel gas channel on its one main surface. The cathode separator is provided with an oxidizing gas channel on its one main surface. The fuel gas (hydrogen) supplied to the anode through the fuel gas channel is ionized ($H^+$), passes through the gas diffusion layer and the catalyst layer of the anode, passes through the polymer electrolyte membrane through water, and migrates to the cathode side. Hydrogen ions reaches the cathode side and generates water in the catalyst layer of the cathode in a power generation reaction as follows:

Anode side: $H_2 \rightarrow 2H^+ + 2e^-$ 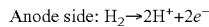

Cathode side: $(1/2)O_2 + 2H^+ + 2e^- \rightarrow H_2O$ 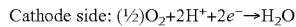

Overall Reaction: $H_2 + (1/2)O_2 \rightarrow H_2O$ 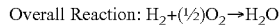

The generated water flows into the oxidizing gas channel formed on the cathode separator in the form of steam or liquid. A part of the water generated in the cathode side migrates to the anode side (so-called flow back) and flows into the fuel gas channel. The generated water which has flowed into the oxidizing gas channel or the fuel gas channel migrates to downstream side along a flow of the oxidizing gas or the fuel gas. For this reason, there is a great variation in a water amount in localized region inside the electrode. This sometimes results in a great variation in the localized region.

As a solution to this problem, there is known a fuel cell including first channels into which gases flow and second channels from which the gases flow out, and having a configuration in which the first channel at the anode side and the second channel at the cathode side are disposed to face each other and sandwich an electrolyte layer, and the second channel at the anode side and the first channel at the cathode side are disposed to face each other and sandwich the electrolyte layer (see e.g., patent literature 1). In addition, there is known a polymer electrolyte fuel cell in which an anode gas channel and a cathode gas channel face each other so as to sandwich a membrane electrode assembly and an anode gas and a cathode gas run along each other within the channels (see e.g., patent literature 2).

In the fuel cell disclosed in patent literature 1, since the fuel gas and the oxidizing gas form a counter flow, and the channels face each other so as to sandwich the electrolyte layer, it is possible to lessen regions with a large water amount in the gas diffusion layers facing each other or regions with a small water amount in the gas diffusion layers facing each other, with the electrolyte layer sandwiched between them. As a result, it is possible to suppress a variation in a power generation amount from increasing in localized region in the electrode.

In the polymer electrolyte fuel cell disclosed in patent literature 2, since the anode gas is more humidified than the cathode gas, water diffuses from the anode gas flowing in the vicinity of an inlet of the anode gas channel, in the vicinity of an inlet of the cathode gas channel, and migrates from the anode electrode side toward the cathode electrode side, while water migrates from the cathode electrode side toward the anode electrode side, in the vicinity of an outlet of the anode gas channel. Thus, it is possible to properly control supply and discharge water in the overall fuel cell and maintain a good power generation performance of the fuel cell.

There is known a polymer electrolyte fuel cell in which an area where a wall surface of a groove forming a reaction gas channel and a reaction gas contact each other in an upstream region of a reaction gas channel is larger than that in other region, thereby suppressing a polymer electrolyte membrane from getting dried (see e.g., patent literature 3). In the polymer electrolyte fuel cell disclosed in patent literature 3, evaporation of water present on a wall inner surface or on a wall surface is promoted and thereby an amount of water evaporating from a groove wall surface side into the reaction gas increases. This makes it possible to suppress water from evaporating from the polymer electrolyte membrane side and the polymer electrolyte membrane from getting dried.

Furthermore, there is known a fuel cell in which an area of an electrolyte layer facing at least one of a fuel gas channel and an oxygen-containing gas channel is reduced, and the fuel gas channel and the oxygen-containing gas channel are arranged alternately in a direction of an electrolyte membrane surface (see e.g., patent literature 4). In the fuel cell disclosed in patent literature 4, it is possible to increase a power generation voltage in the fuel cell by suppressing the gas from permeating into an opposite electrode.

CITATION LISTS

Patent Literature

Patent literature 1: Japanese Laid-Open Patent Application Publication No. 2006-331916
Patent literature 2: Japanese Laid-Open Patent Application Publication No. Hei. 9-283162
Patent literature 3: Japanese Laid-Open Patent Application Publication No. 2005-235418
Patent literature 4: Japanese Laid-Open Patent Application Publication No. 2003-297395

SUMMARY OF THE INVENTION

Technical Problem

However, in the fuel cells disclosed in patent literature 1 to patent literature 4, if the fuel cell is operated under conditions of a high-temperature and a low humidity (e.g., a dew point of the reaction gas is lower than a temperature inside a fuel cell stack), the above reaction does not sufficiently occur in an upstream portion of the reaction gas channel and water is not sufficiently generated, so that a portion of the polymer electrolyte membrane which faces the upstream portion of the reaction gas channel gets dried, ion transmissivity decreases and a power generation efficiency decreases. Thus, there is a room for improvement.

In the polymer electrolyte fuel cell disclosed in patent literature 3, since a portion (rib portion) between grooves formed in the anode separator and a portion (rib portion) between grooves formed in the cathode separator overlap with each other and they do not overlap with each other in a non-uniform manner, a mechanical stress might applied to the polymer electrolyte membrane, and the polymer electrolyte membrane might be degraded. Thus, there is a room for improvement.

The present invention has been made to solve the above problem, and an object of the present invention is to provide a polymer electrolyte fuel cell capable of suppressing degradation of a polymer electrolyte membrane particularly when the polymer electrolyte fuel cell is operated under conditions of a high-temperature and a low humidity, and a fuel cell stack comprising the polymer electrolyte fuel cell.

Solution to Problem

It is known that during an operation of the fuel cell, a content of water (liquid water and gaseous water) in a portion of the electrode which faces the reaction gas channel is lower than a content of water in a portion of the electrode which contacts a rib portion formed between adjacent reaction gas channels. FIG. 15 is a schematic view showing a water content in the electrode.

The inventors studied intensively to solve the problem associated with the prior art and found the following. As shown in FIG. 15, water present in a portion 202A of an electrode 202 which contacts a rib portion 204 formed between adjacent reaction gas channels 203 diffuses toward a portion 202B of the electrode 202 which faces the reaction gas channel 203, and a water content is higher in the vicinity of a region of the electrode 202 in a boundary between the rib portion 204 and the reaction gas channel 203 than in a center region of the portion 202B of the electrode 202. In other words, the water content is less in a region of the electrode 202 which is more distant from the portion 202A which contacts the rib portion 204. To solve the above mentioned problem, the inventors discovered that the object of the present invention is achieved effectively by using the configuration described below.

A polymer electrolyte fuel cell of the present invention comprises a membrane-electrode assembly including a polymer electrolyte membrane and a pair of electrodes sandwiching a portion of the polymer electrolyte membrane which is inward relative to a peripheral portion of the polymer electrolyte membrane; an electrically-conductive first separator which is of a plate shape and is provided in contact with one of the pair of electrodes of the membrane-electrode assembly; and an electrically-conductive second separator which is of a plate shape and is provided in contact with the other of the pair of electrodes of the membrane-electrode assembly; the first separator being provided with a first reaction gas channel on one main surface of the first separator which contacts the electrode such that a plurality of first rib portions run along each other; the second separator being provided with a second reaction gas channel on one main surface of the second separator which contacts the electrode such that a plurality of second rib portions run along each other; the first reaction gas channel being configured such that, in a portion (hereinafter referred to as an upstream portion of the first reaction gas channel) extending from a portion which contacts the electrode first from an upstream end thereof to a predetermined length toward downstream side, a ratio (hereinafter referred to as a ratio of a first reaction gas channel width to the second rib portion) of a widthwise portion of the first reaction gas channel which overlaps with the second rib portion of the second separator, when viewed in a thickness direction of the first separator, with respect to an overall width of the first reaction gas channel, is set larger than a ratio of a first reaction gas channel width of a portion (hereinafter referred to as a downstream portion of the first reaction gas channel) of the first reaction gas channel which is other than the upstream portion, and a ratio of the first reaction gas channel width of the upstream portion of the first reaction gas channel to the second rib portion is set to a predetermined ratio.

As explained above, a water content in a portion of the electrode which faces the upstream portion of the first reaction gas channel is lower than a water content in a portion of the electrode which contacts the rib portion. On the other hand, in the present invention, at least a portion of the upstream portion of the first reaction gas channel overlaps with the second rib portion of the second separator, when viewed in the thickness direction of the first separator. That is, in the polymer electrolyte fuel cell of the present invention, at least a portion (hereinafter referred to as a portion of one electrode which faces the channel) of one electrode which faces the upstream portion of the first reaction gas channel overlaps with a portion (hereinafter referred to as a portion of the other electrode which faces the rib portion) of the other electrode which contacts the second rib portion of the second separator, when viewed in the thickness direction of the first separator. Because of this structure, water migrates from the portion of the other electrode facing the rib portion with a high water content, to the portion of one electrode which faces the channel with a low water content. This makes it possible to suppress the portion of the polymer electrolyte membrane which faces the upstream portion of the first reaction gas channel from getting dried. As a result, it possible to suppress the portion of the polymer electrolyte membrane which faces the upstream portion of the first reaction gas channel from getting dried and suppress the polymer electrolyte membrane from being degraded, particularly in a case where the polymer electrolyte fuel cell of the present invention is operated under conditions of a high-temperature and a low humidity.

By the way, when the polymer electrolyte fuel cell is fastened, a pressure is applied to a portion of a MEA (to be precise, electrode) which contacts the first rib portion (second rib portion). In a structure in which the first rib portion and the second rib portion do not overlap with each other when viewed in the thickness direction of the first separator, a stress concentrates on a portion of the MEA (to be precise, electrode) which contacts an end portion of the first rib portion (second rib portion) and a mechanical stress is applied to the polymer electrolyte membrane, which would possibly degrade the polymer electrolyte membrane. Like the polymer electrolyte fuel cell disclosed in patent literature 3, if a portion (rib portion) formed between grooves of the anode separator and a portion (rib portion) formed between grooves of the second separator are formed such that they overlap with each other and do not overlap with each other in a non-uniform manner, a mechanical stress is further applied to the polymer electrolyte membrane.

However, in the polymer electrolyte fuel cell of the present invention, since the first reaction gas channel is formed on the first separator in such a manner that a ratio of the first reaction gas channel width of the upstream portion of the first reaction gas channel to the second rib portion is the predetermined ratio, it is possible to suppress a pressure from being applied to the polymer electrolyte membrane unevenly, and hence suppress the polymer electrolyte membrane from being degraded.

In the polymer electrolyte fuel cell of the present invention, the ratio of the first reaction gas channel width of the upstream portion of the first reaction gas channel to the second rib portion may be not less than ½ and not more than 1.

In the polymer electrolyte fuel cell of the present invention, the ratio of the first reaction gas channel width of the upstream portion of the first reaction gas channel to the second rib portion may be 1.

In the above configuration, the portion of one electrode which faces the channel overlaps with the portion of the other electrode which faces the rib portion in the width direction of the first reaction gas channel, when viewed in a thickness direction of the first separator. As a result, it possible to more effectively suppress the portion of the polymer electrolyte membrane which faces the upstream portion of the first reaction gas channel from getting dried and suppress the polymer electrolyte membrane from being degraded, particularly in a case where the polymer electrolyte fuel cell of the present invention, is operated under conditions of a high-temperature and a low humidity.

In the polymer electrolyte fuel cell of the present invention, the ratio of the first reaction gas channel width of the downstream portion of the first reaction gas channel to the second rib portion is 0.

In the polymer electrolyte fuel cell of the present invention, the upstream portion of the first reaction gas channel may include a first upstream portion and a second upstream portion located downstream of the first upstream portion; and the first reaction gas channel may be configured such that a ratio of the first reaction gas channel width of the first upstream portion of the first reaction gas channel to the second rib portion is a first predetermined ratio, and a ratio of the first reaction gas channel width of the second upstream portion of the first reaction gas channel to the second rib portion is a second predetermined ratio.

In the polymer electrolyte fuel cell of the present invention, the first predetermined ratio may be larger than the second predetermined ratio.

In the polymer electrolyte fuel cell of the present invention, the first predetermined ratio may be 1 and the second predetermined ratio may be ½.

In the polymer electrolyte fuel cell of the present invention, the first rib portion formed in the downstream portion of the first reaction gas channel may overlap with the second rib portion, when viewed in a thickness direction of the first separator.

As explained above, a portion of the polymer electrolyte membrane which faces the downstream portion of the reaction gas channel is humidified by generated water flowing through the reaction gas channel. When the polymer electrolyte fuel cell is fastened, a pressure is applied to a portion of a MEA (to be precise, electrode) which contacts the first rib portion (second rib portion). In a structure in which the first rib portion and the second rib portion do not overlap with each other when viewed in the thickness direction of the first separator, a stress concentrates on a portion of the MEA (to be precise, electrode) which contacts an end portion of the first rib portion (second rib portion) and a mechanical stress is applied to the polymer electrolyte membrane. This would possibly degrade the polymer electrolyte membrane. However, in the polymer electrolyte fuel cell of the present invention, at least a portion of the first rib portion in the downstream portion of the first reaction gas channel, which portion is formed by a portion running along the second reaction gas channel, is formed to overlap with the second rib portion, when viewed in the thickness direction of the first separator. Thus, it is possible to suppress a mechanical stress from being applied to the polymer electrolyte membrane and hence suppress the polymer electrolyte membrane from being degraded due to the mechanical stress.

In the polymer electrolyte fuel cell of the present invention, a groove-shaped cooling medium channel may be provided on the other main surface of the first separator and/or the other main surface of the second separator; and a dew point of the first reaction gas flowing through the first reaction gas channel and a dew point of the second reaction gas flowing through the second reaction gas channel may be lower than a temperature of a cooling medium flowing through the cooling medium channel.

In the polymer electrolyte fuel cell of the present invention, the first reaction gas channel and/or the second reaction gas channel may have a serpentine shape.

In the polymer electrolyte fuel cell of the present invention, the first reaction gas channel and/or the second reaction gas channel may have a spiral shape.

In the polymer electrolyte fuel cell of the present invention, the first reaction gas channel and/or the second reaction gas channel may include an upstream gas channel, a downstream gas channel, and a plurality of communication gas channels which provide communication between the upstream gas channel and the downstream gas channel and have a straight-line shape.

In the polymer electrolyte fuel cell of the present invention, the first reaction gas channel and the second reaction gas channel may form a parallel flow.

In the polymer electrolyte fuel cell of the present invention, the first separator may be provided with a first reaction gas supply manifold hole penetrating in a thickness direction thereof and the second separator may be provided with a second reaction gas supply manifold hole penetrating in a thickness direction thereof such that the first reaction gas supply manifold hole and the second reaction gas supply manifold hole face each other.

In the polymer electrolyte fuel of the present invention, a width of the upstream portion of the first reaction gas channel may be smaller than a width of the downstream portion of the first reaction gas channel.

In this configuration, it is possible to reduce the portion of one electrode which faces the upstream portion of the first reaction gas channel and to suppress this portion and hence the portion of the polymer electrolyte membrane which faces the upstream portion of the first reaction gas channel, from getting dried. As a result, it is possible to suppress the polymer electrolyte membrane from being degraded.

A fuel cell stack of the present invention is a fuel cell stack including a plurality of polymer electrolyte fuel cells each of which is as recited above, the plurality of polymer electrolyte fuel cells being stacked together and fastened together.

The above and further objects, features and advantages of the present invention will more fully be apparent from the following detailed description of preferred embodiments with reference to accompanying drawings.

Advantageous Effects of the Invention

In accordance with the polymer electrolyte fuel cell and the fuel cell stack including the polymer electrolyte fuel cell, of the present invention, it possible to suppress the polymer electrolyte membrane from getting dried, and thereby suppress the polymer electrolyte membrane from being degraded, in a case where the fuel cell is operated under conditions of a high-temperature and a low humidity.

DESCRIPTION OF EMBODIMENTS

Figure 1:
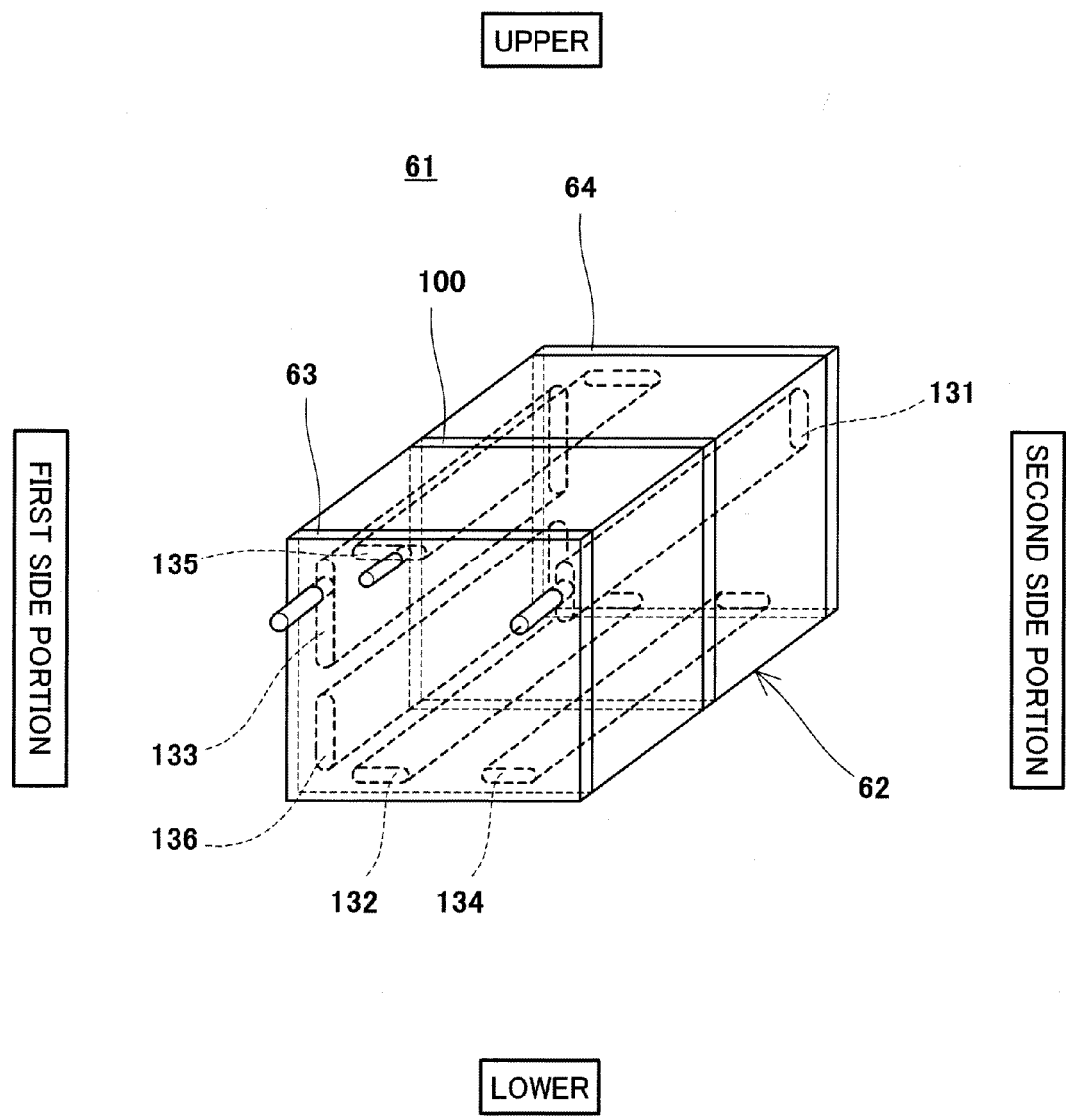
FIG. 1 is a perspective view schematically showing a configuration of a fuel cell stack according to Embodiment 1 of the present invention.

Hereinafter, preferred embodiments of the present invention will be described with reference to the drawings. Throughout the drawings, the same or corresponding parts are designated by the same reference numerals and repetitive description thereof is sometimes omitted.

Embodiment 1

[Configuration of Fuel Cell Stack]

FIG. 1 is a perspective view schematically showing a configuration of a fuel cell stack according to Embodiment 1 of the present invention. In FIG. 1, upper and lower sides of the fuel cell stack are depicted as upper and lower sides of FIG. 1.

As shown in FIG. 1, a fuel cell stack 61 according to Embodiment 1 of the present invention includes a cell stack body 62 in which polymer electrolyte fuel cells 100 (hereinafter simply referred to as fuel cells) entirely having a plate shape are stacked together in a thickness direction, first and second end plates 63 and 64 disposed at both ends of the cell stack body 62 and fastener members for fastening the cell stack body 62, and the first and second end plates 63 and 64 together in the direction in which the fuel cells 100 are stacked together. Current collectors and insulating plates are provided at the first and second end plates 63 and 64, respectively, but are not illustrated. The fuel cells 100 of a plate shape extend in parallel with a vertical plane. The direction in which the fuel cells 100 are stacked together is a horizontal direction.

At an upper portion of one side portion (left side portion in FIG. 1: hereinafter referred to as first side portion) of the cell stack body 62, an oxidizing gas supply manifold hole 133 is provided to penetrate the cell stack body 62 in the stack direction of the fuel cells 100, while at a lower portion thereof, a cooling medium discharge manifold 136 is provided. At an inner side of the upper portion of the first side portion of the cell stack body 62 where the oxidizing gas supply manifold 133 is provided, a cooling medium supply manifold 135 is provided to penetrate the cell stack body 21 in the stack direction of the fuel cell 100. Likewise, at an inner side of the lower portion where the cooling medium discharge manifold 136 is provided, a fuel gas exhaust manifold 132 is provided to penetrate the cell stack body 62 in the stack direction of the fuel cells 100. Furthermore, at an upper portion of the other side portion (right side portion in FIG. 1: hereinafter referred to as second side portion) of the cell stack body 62, a fuel gas supply manifold 131 is provided to penetrate the cell stack body 62 in the stack direction of the fuel cells 100, while at a lower portion thereof, an oxidizing gas exhaust manifold 134 is provided to penetrate the cell stack body 62 in the stack direction of the fuel cells 100.

Suitable pipes are provided at the manifolds, respectively. Through the suitable pipes, a fuel gas, an oxidizing gas and a cooling medium are supplied and exhausted/discharged to and from the fuel cell stack 61.

[Configuration of Polymer Electrolyte Fuel Cell]

Next, a configuration of the polymer electrolyte fuel cell according to Embodiment 1 of the present invention will be described with reference to FIG. 2.

Figure 2:
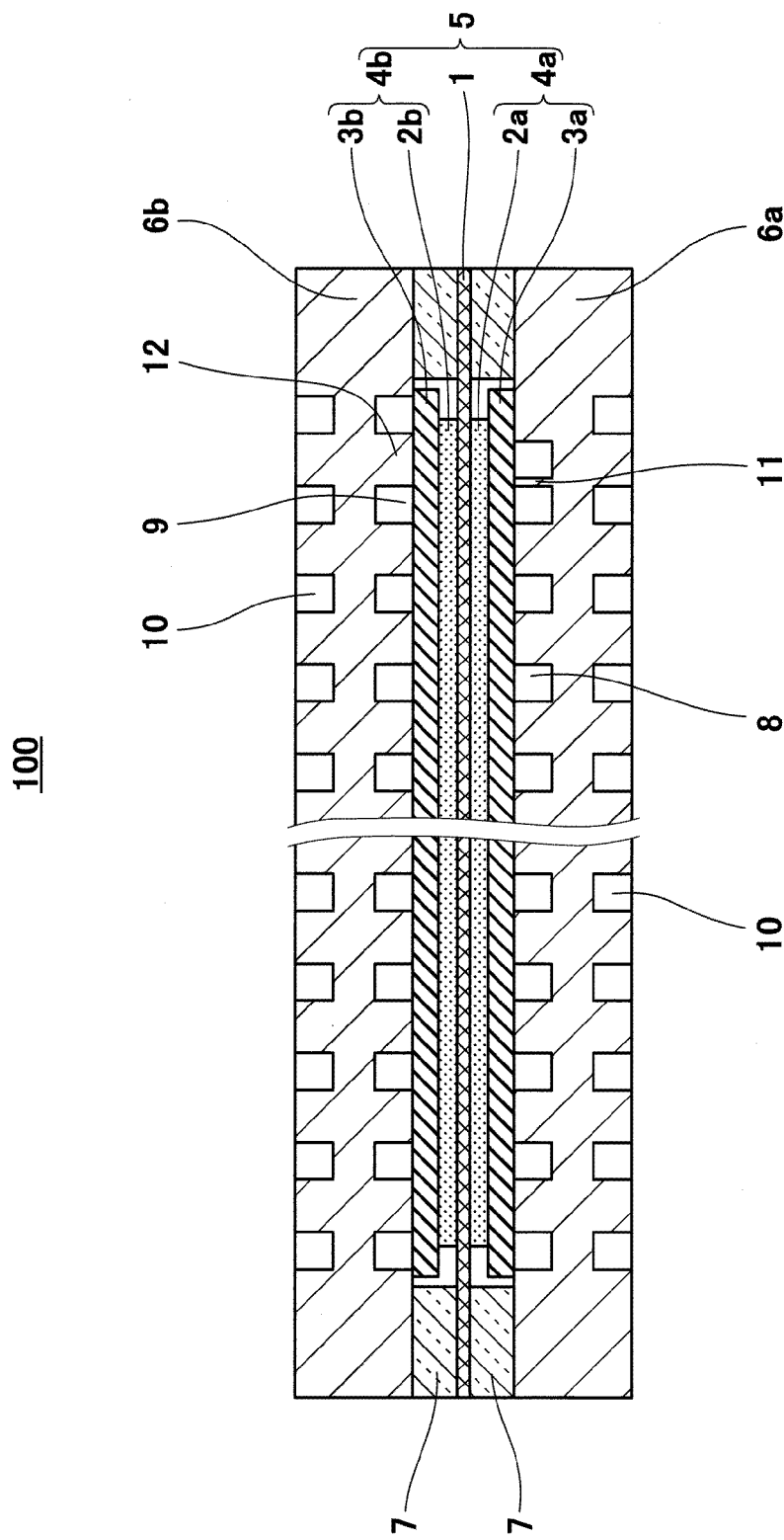
FIG. 2 is a cross-sectional view schematically showing a configuration of a polymer electrolyte fuel cell in the fuel cell stack of FIG. 1.

FIG. 2 is a cross-sectional view schematically showing a configuration of a fuel cell 100 in the fuel cell stack 61 of FIG. 1. In FIG. 2, a part of the configuration is omitted.

As shown in FIG. 2, the fuel cell 100 of Embodiment 1 includes a MEA (Membrane-Electrode-Assembly) 5, gaskets 7, an anode separator 6a, and a cathode separator 6b.

The MEA 5 has a polymer electrolyte membrane 1 which selectively transports hydrogen ions, an anode 4a and a cathode 4b. The polymer electrolyte membrane 1 has a substantially quadrilateral (in Embodiment 1 rectangular) shape and is provided at its both surfaces with the anode 4a and the cathode 4b which are located inward relative to a peripheral portion of the membrane 1. Manifold holes (not shown) such as the oxidizing gas exhaust manifold hole are provided to penetrate the peripheral portion of the polymer electrolyte membrane 1 in the thickness direction.

The anode 4a includes an anode catalyst layer 2a which is provided on one main surface of the polymer electrolyte membrane 1 and includes catalyst carrying carbon composed of carbon powder (electrically conductive carbon particles) carrying platinum-based metal catalyst (electrocatalyst) and polymer electrolyte adhering to the catalyst carrying carbon, and an anode gas diffusion layer 3a which is provided on the anode catalyst layer 2a and has gas permeability and electrical conductivity. Likewise, the cathode 4b includes a cathode catalyst layer 2b which is provided on the other main surface of the polymer electrolyte membrane 1 and includes catalyst carrying carbon composed of carbon powder (electrically conductive carbon particles) carrying platinum-based metal catalyst (electrocatalyst) and polymer electrolyte adhering to the catalyst carrying carbon, and an cathode gas diffusion layer 3b which is provided on the cathode catalyst layer 2b and has gas permeability and electrical conductivity.

The pair of annular gaskets 7 which are made of fluorocarbon rubber are provided around the anode 4a and the cathode 4b (to be precise, anode gas diffusion layer 3a and cathode gas diffusion layer 3b) of the MEA 5 such that the gaskets 6 sandwich the polymer electrolyte membrane 1. This prevents the fuel gas and the oxidizing gas from leaking to outside the cell and prevents these gases from being mixed inside the fuel cell 100. Manifold holes (not shown) such as the oxidizing gas exhaust manifold hole are formed to penetrate the peripheral portions of the gaskets 7 in the thickness direction thereof.

The electrically-conductive anode separator (first separator) 6a and the electrically-conductive cathode separator (second separator) 6b are provided to sandwich the MEA 5 and the gaskets 7. Thus, the MEA 5 is mechanically fastened and electric connection of the MEA 5 is formed in a state where a plurality of fuel cells 100 are stacked together in the thickness direction thereof. The separators 6a and 6b may be formed of a metal which is high in heat conductivity and electric conductivity, graphite or a mixture of graphite and resin. For example, a mixture of carbon powders and a binder (solvent) which is fabricated by injection molding or a plate material which is made of titanium or stainless steel and has a gold-plated surface may be used.

A groove-shaped fuel gas channel (first reaction gas channel) 8 is provided on one main surface (hereinafter referred to as inner surface) of the anode separator 6a which is in contact with the anode 4a to flow the fuel gas therethrough, while groove-shaped cooling medium channel(s) 10 is/are provided on the other main surface (hereinafter referred to as outer surface) of the anode separator 6a to flow a cooling medium therethrough. Likewise, a groove-shaped oxidizing gas channel (second reaction gas channel) 9 is provided on one main surface (hereinafter referred to as inner surface) of the cathode separator 6b which is in contact with the cathode 4b to flow the oxidizing gas therethrough, while groove-shaped cooling medium channel(s) 10 is/are provided on the other main surface (hereinafter referred to as outer surface) of the cathode separator 6b to flow a cooling medium therethrough.

In the above configuration, the fuel gas and the oxidizing gas are supplied to the anode 4a and the cathode 4b, respectively, and these gases react with each other to generate electricity and heat. A cooling medium such as cooling water is flowed through the cooling medium channel 10 to recover the generated heat.

The fuel cell 100 configured as described above may be used as a single cell, or otherwise a plurality of fuel cells 100 may be stacked together to form the fuel cell stack 61. When the fuel cells 100 are stacked together, the cooling medium channel(s) 10 may be provided for each set of two or three cells. When the cooling medium channel(s) 10 is/are not provided between the cells, a single separator sandwiched between two MEAs 5 may be provided with the fuel gas channel 8 on one main surface thereof and the oxidizing gas channel 9 on the other main surface thereof so that the single separator can serve as both of the anode separator 6a and the cathode separator 6b. Although in this embodiment, the first separator is the anode separator 6a, the second separator is the cathode separator 6b, the first reaction gas channel is the fuel gas channel 8 and the second reaction gas channel is the oxidizing gas channel 9, the present invention is not limited this, but the first separator may be the cathode separator 6b, the second separator may be the anode separator 6a, the first reaction gas channel may be the oxidizing gas channel 9 and the second reaction gas channel may be the fuel gas channel 8.

[Configuration of Separator]

Subsequently, the cathode separator 6b and the anode separator 6a will be described in detail with reference to FIGS. 2 to 4.

Figure 3:
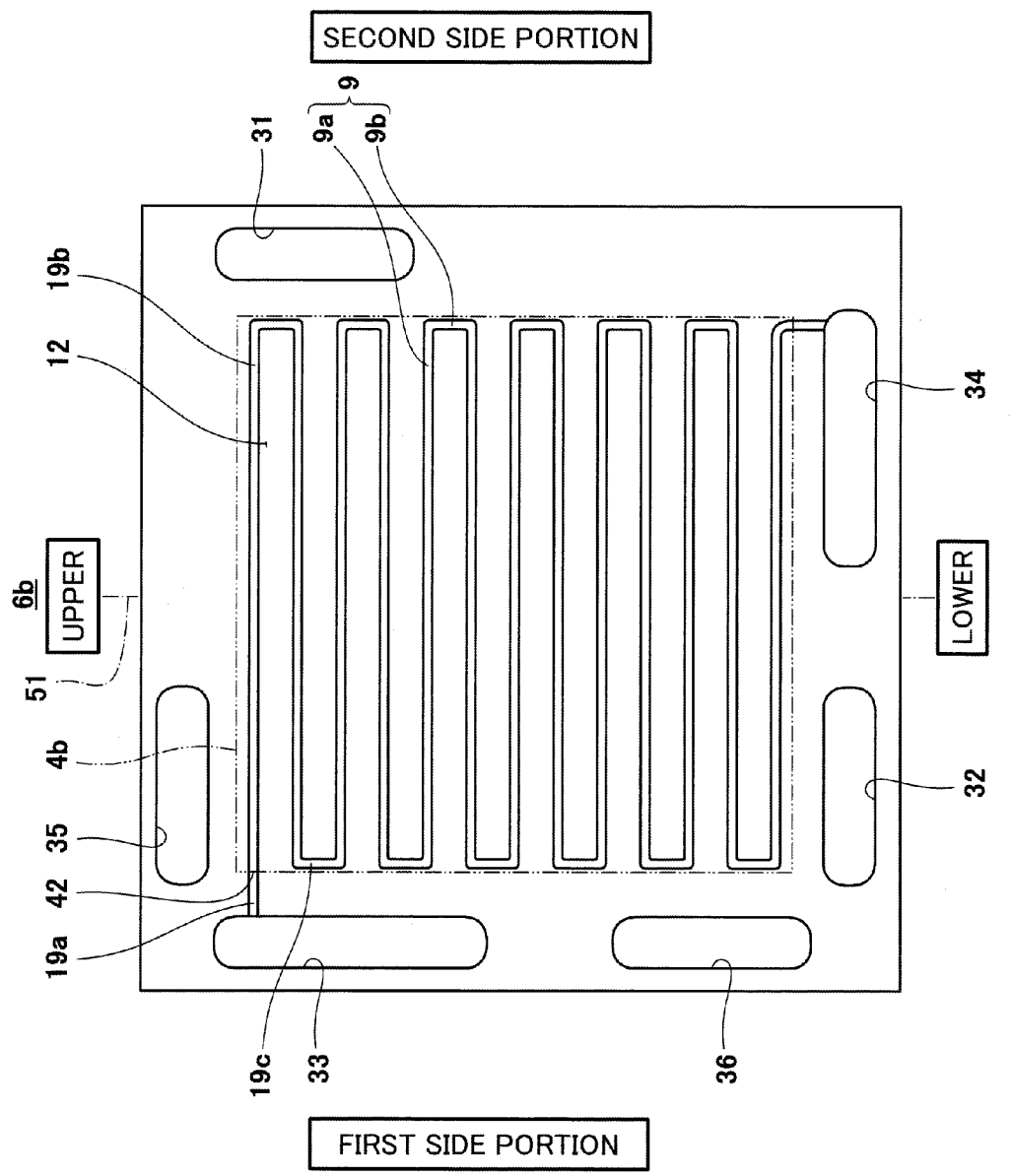
FIG. 3 is a schematic view showing a configuration of a cathode separator of the polymer electrolyte fuel cell of FIG. 2.

FIG. 3 is a schematic view showing a configuration of the cathode separator 6b of the fuel cell 100 of FIG. 2. FIG. 4 is a schematic view showing a configuration of the anode separator 6a of the fuel cell 100 of FIG. 2. In FIGS. 3 and 4, the upper and lower sides of the cathode separator 6b and the anode separator 6a are depicted as the upper and lower sides in these Figures. FIG. 4 depicts that a part of the oxidizing gas channel 9 is indicated by imaginary line (two-dotted line).

Firstly, the configuration of the cathode separator 6b will be described with reference to FIGS. 2 and 3.

As shown in FIG. 3, the cathode separator 6b is formed by a plate and has a substantially quadrilateral (in this embodiment rectangular) shape. Manifold holes such as the fuel gas supply manifold hole 31 are provided in the peripheral portion of the cathode separator 6b to penetrate therethrough in the thickness direction thereof. To be specific, at an upper portion of one side portion (hereinafter referred to as first side portion) of the cathode separator 6b, an oxidizing gas supply manifold hole (second reaction gas supply manifold hole) 33 is provided, while at a lower portion thereof, a cooling medium discharge manifold hole 36 is provided. At an inner side of the upper portion of the first side portion where the oxidizing gas supply manifold hole 33 is provided, a cooling medium supply manifold hole 35 is provided. Likewise, at an inner side of a lower portion where the cooling medium discharge manifold hole 36 is provided, a fuel gas exhaust manifold hole 32 is provided. Furthermore, at an upper portion of the other side portion (hereinafter referred to as second side portion) of the cathode separator 6b, a fuel gas supply manifold hole (first reaction gas channel) 31 is provided, while at a lower portion thereof, an oxidizing gas exhaust manifold hole 34 is provided. It should be noted that the fuel gas supply manifold hole 31 and the oxidizing gas supply manifold hole 33 are disposed opposite to each other so as to sandwich a center line between them.

As shown in FIGS. 2 and 3, the groove-shaped oxidizing gas channel 9 is formed on the inner surface of the cathode separator 6b in a serpentine shape so as to connect the oxidizing gas supply manifold hole 33 to the oxidizing gas exhaust manifold hole 34. In this embodiment, the oxidizing gas channel 9 is formed by a single groove which is substantially composed of a reciprocating portion 9a and an inverted portion 9b.

To be specific, the groove forming the oxidizing gas channel 9 extends horizontally a certain distance from the oxidizing gas supply manifold hole 33 toward the second side portion and further extends therefrom downward a certain distance. From that point, the groove extends horizontally a certain distance toward the first side portion and extends therefrom downward a certain distance. The above extension pattern is repeated five times, and then the groove extends horizontally a certain distance toward the second side portion. From that point, the groove extends downward to reach the oxidizing gas exhaust manifold hole 34. A horizontally extending portion of the oxidizing gas channel 9 forms the reciprocating portion 9a and a downwardly extending portion thereof forms the inverted portion 9b. As shown in FIGS. 2 and 3, a portion between the groove (to be precise reciprocating portion 9a) forming the oxidizing gas channel 9 and the groove (to be precise reciprocating portion 9a) forming the oxidizing gas channel 9 forms a second rib portion 21 which contacts the cathode 4b.

To be specific, the oxidizing gas channel 9 is formed such that a plurality of second rib portions 12 run along each other. As used herein, a phrase "second rib portions 12 run along each other" means that they are arranged to side by side. In other words, among the plurality of second rib portions 12, a certain second rib portion 12 is specified and another second rib 12 runs along the specified second rib portion 12.

The oxidizing gas channel 9 includes a most-upstream portion 19a, an upstream portion 19b and a downstream portion 19c. An upstream end of the most-upstream portion 19a is the oxidizing gas supply manifold hole 33 which is an upstream end of the oxidizing gas channel 9, while a downstream end thereof is a portion 42 connected to the cathode 4b first from the upstream end of the oxidizing gas channel 9 when viewed in a thickness direction of the cathode separator 6b. The upstream portion 19b is at least a portion extending between the portion 42 which is one end and a portion satisfying a formula: $L4 \leq \{(2/3) \times L5\}$ which is an opposite end, although its downstream end is different depending on a configuration such as a width of the oxidizing gas channel 9, a dew point of the reaction gas, a temperature of the cooling medium, etc.

In the formula, L4 indicates a channel length of the upstream portion 19b of the oxidizing gas channel 9, and L5 indicates an overall length of the oxidizing gas channel 9. In Embodiment 1, the opposite end of the upstream portion 19b is a downstream end of a first reciprocating portion 9a from upstream side. In other words, the upstream portion 19b is a portion extending from the portion 42 of the oxidizing gas channel 9 to a terminal end of a portion horizontally extending toward the second side portion (portion extending from the portion 42 of the oxidizing gas channel 9 to downstream end of the first reciprocating portion 9a).

The downstream portion 19c is a portion extending between the oxidizing gas exhaust manifold hole 34 which is the downstream end of the oxidizing gas channel 9, as one end, and a portion satisfying a formula: $L6 \leq \{(1/3) \times L5\}$ as an opposite end. In the above formula, L6 indicates a channel length of the downstream portion 19c of the oxidizing gas channel 9. In Embodiment 1, the opposite end of the downstream portion 19c is the downstream end of the first reciprocating portion 9a.

Although in Embodiment 1, the oxidizing gas channel 9 is formed by a single groove, the present invention is not limited to this, but a plurality of grooves may be formed on the inner surface of the cathode separator 6b to form a plurality of oxidizing gas channel groups. In this case, the second rib 12 is formed by a portion between the grooves (to be precise, reciprocating portions 9a) forming each oxidizing gas channel 9.

Subsequently, a configuration of the anode separator 6a will be described in detail with reference to FIGS. 2 to 4.

Figure 4:
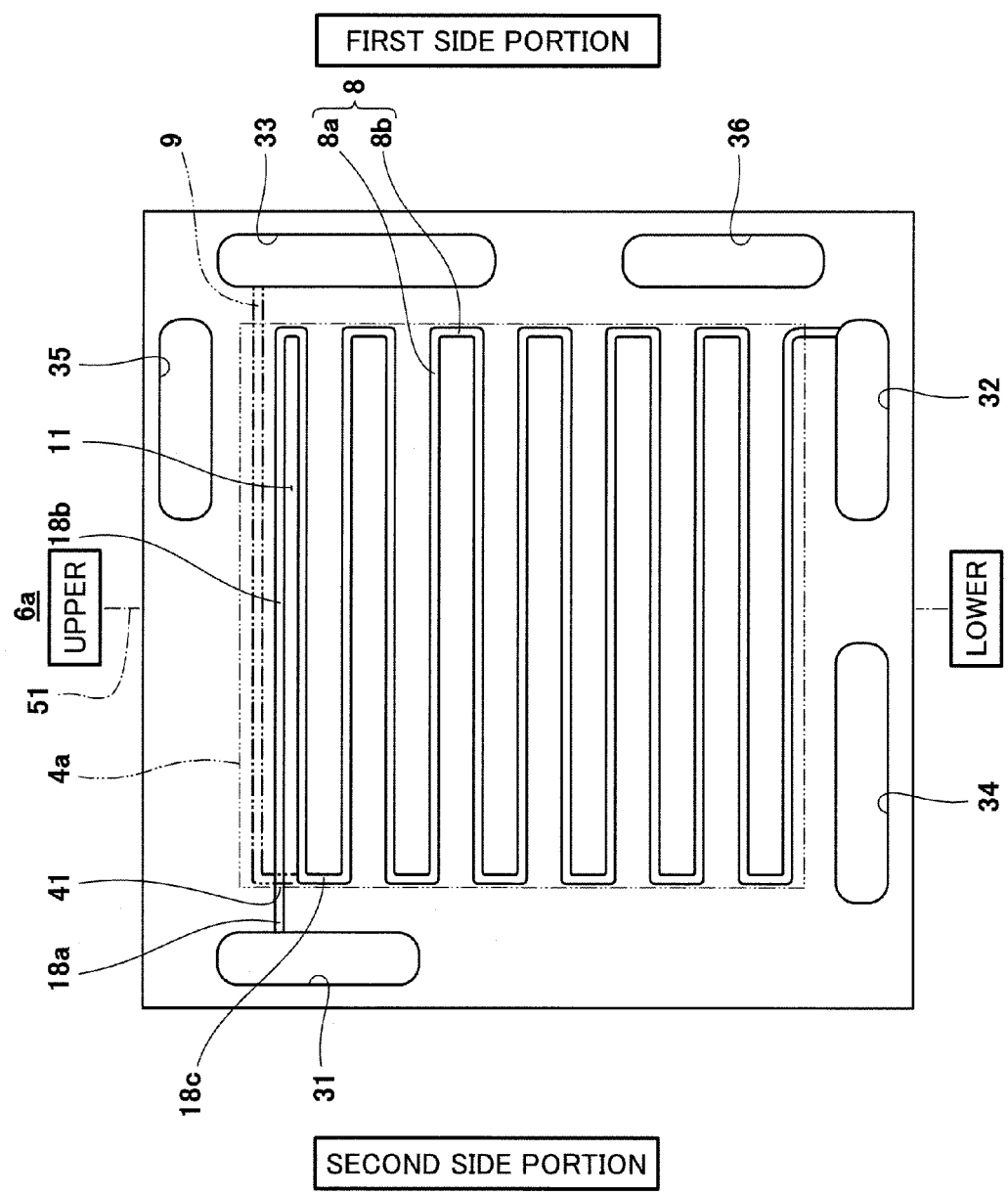
FIG. 4 is a schematic view showing a configuration of an anode separator of the polymer electrolyte fuel cell of FIG. 2.

As shown in FIGS. 2 to 4, the anode separator 6a is formed by a plate and has a substantially quadrilateral (in this embodiment rectangular) shape. Manifold holes such as the fuel gas supply manifold hole 31 are provided in the peripheral portion of the anode separator 6a to penetrate therethrough in the thickness direction thereof. The arrangement of the manifold holes is the same as that of the cathode separator 6b and will not be described in detail.

A groove-shaped fuel gas channel 8 is formed on the inner surface of the anode separator 6a in a serpentine shape to connect the fuel gas supply manifold hole 31 to the fuel gas exhaust manifold hole 32. The fuel gas channel 8 and the oxidizing gas channel 9 form a so-called parallel flow. As used herein, the parallel flow refers to a structure in which the fuel gas channel 8 and the oxidizing gas channel 9 have localized regions where the oxidizing gas and the fuel gas flow in opposite directions and flow upstream to downstream substantially in the same direction macroscopically (as a whole) when viewed in the thickness direction of the fuel cell 100.

As shown in FIG. 4, the fuel gas channel 8 is formed by a single groove composed of a reciprocating portion 8a and an inverted portion 8b. To be specific, the groove forming the fuel gas channel 8 extends horizontally a certain distance from the fuel gas supply manifold hole 31 toward the first side portion and further extends therefrom downward a certain distance. From that point, the groove extends horizontally a certain distance toward the second side portion and then extends therefrom downward a certain distance. The above extension pattern is repeated five times, and then the groove extends horizontally a certain distance toward the first side portion. From that point, the groove extends downward to reach the fuel gas exhaust manifold hole 32. A horizontally extending portion of the fuel gas channel 8 forms the reciprocating portion 8a and a downwardly extending portion thereof forms the inverted portion 8b. A portion between the groove (to be precise reciprocating portion 8a) forming the fuel gas channel 8 and the groove (to be precise reciprocating portion 8a) forming the fuel gas channel 8 forms a first rib portion 11 which contacts the anode 6a.

To be specific, the fuel gas channel 8 is formed such that a plurality of first rib portions 11 run along each other. As used herein, a phrase "first rib portions 11 run along each other" means that they are arranged to extend along each other. In other words, among the plurality of first rib portions 11, a certain first rib portion 11 is specified and another first rib 11 runs along the specified first rib portion 11.

Although in Embodiment 1, the fuel gas channel 8 is formed by a single groove, the present invention is not limited to this, but a plurality of grooves may be formed on the inner surface of the anode separator 6a to form a plurality of fuel gas channel groups. In this case, the first rib 11 is formed by a portion between the grooves (to be precise, reciprocating portions 8a) forming each fuel gas channel 8.

The fuel gas channel 8 includes a most-upstream portion 18a, an upstream portion 18b and a downstream portion 18c. An upstream end of the most-upstream portion 18a is the fuel gas supply manifold hole 31 which is an upstream end of the fuel gas channel 8, while a downstream end thereof is a portion 41 connected to the anode 4a first from the upstream end of the fuel gas channel 8 when viewed in a thickness direction of the anode separator 6a. The upstream portion 18b is at least a portion extending between the portion 41 which is one end and a portion satisfying a formula: $L1 \leq \{(2/3) \times L2\}$ which is an opposite end, although its downstream end is different depending on a configuration such as a width of the fuel gas channel 8, a dew point of the reaction gas, a temperature of the cooling medium, etc.

In the formula, L1 indicates a channel length of the upstream portion 18b of the fuel gas channel 8, and L2 indicates an overall length of the fuel gas channel 8. In Embodiment 1, the opposite end of the upstream portion 18b is a downstream end of a first reciprocating portion 8a from upstream side. In other words, the upstream portion 18b is a portion extending from the portion 41 of the fuel gas channel 8 to a terminal end of a portion horizontally extending toward the first side portion (portion extending from the portion 41 of the fuel gas channel 8 to a downstream end of the first reciprocating portion 8a).

The downstream portion 18c is a portion extending between the fuel gas exhaust manifold hole 32 which is the downstream end of the fuel gas channel 8, as one end, and a portion satisfying a formula: $L3 \leq \{(1/3) \times L2\}$ as an opposite end. In the above formula, L3 indicates a channel length of the downstream portion 18c of the fuel gas channel 8. In Embodiment 1, the opposite end of the downstream portion 18c is the downstream end of the first reciprocating portion 8a.

As shown in FIGS. 2 to 4, the fuel gas channel 8 has a portion where the fuel gas channel 8 runs along the oxidizing gas channel 9. As used herein, the phrase "the channels run along each other" means that the channels are arranged side by side when viewed in the thickness direction of the anode separator 6a. In this embodiment, the reciprocating portion 8a constituting the downstream portion 18c of the fuel gas channel 8, except for the most-upstream portion 18a and the upstream portion 18b of the fuel gas channel 8, and the reciprocating portion 9a of the oxidizing gas channel 9, overlap with each other, when viewed in the thickness direction of the anode separator 6a.

The upstream portion 18b of the fuel gas channel 8 overlaps with (faces) the second rib portion 12 formed between a first reciprocating portion 9a and a second reciprocating portion 9a in the oxidizing gas channel 9, when viewed in the thickness direction of the anode separator 6a. In other words, in the fuel cell 100 of Embodiment 1, a portion of the anode 4a which faces the upstream portion 18a of the fuel gas channel 8 and has a low water content overlaps with a portion of the cathode 4b which contacts the second rib portion 12. In this structure, since water shifts from the portion of the cathode 4b which contacts the second rib portion 12 to the portion of the anode 4a which faces the upstream portion 18a of the fuel gas channel 8, it is possible to suppress a portion of the polymer electrolyte membrane 1 which faces the upstream portion 18b of the fuel gas channel 8 from getting dried and from being degraded.

A ratio of a widthwise portion of the upstream portion 18b of the fuel gas channel 8 which overlaps with the second rib portion 12 of the cathode separator 6b, when viewed in the thickness direction of the anode separator 6a, with respect to an overall width of the fuel gas channel 8 (hereinafter referred to as a ratio of a fuel gas channel width to the second rib portion 12) is set to a predetermined ratio, in this embodiment, 1. In this way, a portion where the first rib portion 11 and the second rib portion 12 overlap with each other and a portion where the first rib portion 11 and the second rib portion 12 do not overlap with each other when viewed in the thickness direction of the anode separator 6a are formed uniformly, thereby suppressing a pressure from being applied unevenly to the polymer electrolyte membrane 1. As a result, degradation of the polymer electrolyte membrane 1 can be suppressed.

An upstream portion of the oxidizing gas channel 9 (portion extending from a portion of the oxidizing gas channel 9 which contacts the cathode 4b first to a downstream end of the first reciprocating portion 9a) overlaps with the inner surface of the anode separator 6a, when viewed in the thickness direction of the anode separator 6a. Because of this, it is also possible to suppress the portion of the polymer electrolyte membrane 1 which faces the upstream portion of the oxidizing gas channel 9 when viewed in the thickness direction of the anode separator 6a, from getting dried and from being degraded.

The downstream portion 18c of the fuel gas channel 8 is formed such that the reciprocating portion 8a constituting the downstream portion 18c overlaps with the reciprocating portion 9a of the oxidizing gas channel 9, when viewed in the thickness direction of the anode separator 6a. In other words, the first rib portion 11 formed between the reciprocating portions 8a constituting the downstream portion 18c of the fuel gas channel 8 overlaps with the second rib portion 12 formed between the reciprocating portions 9a constituting the oxidizing gas channel 9. Because of this, in the downstream portion 18c of the fuel gas channel 8, it is possible to suppress a stress from concentrating on portions of the anode 4a and the cathode 4b in the MEA 5 which contact an end portion of the first rib portion 11 and an end portion of the second rib portion 12, respectively, and hence suppress a mechanical stress from being applied to the polymer electrolyte membrane 1. As a result, it is possible to suppress the polymer electrolyte membrane 1 from being degraded due to a mechanical stress.

Subsequently, advantages of the fuel cell stack 61 (fuel cell 100) according to Embodiment 1 will be described with reference to FIGS. 1 to 4.

[Advantages of Fuel Cell Stack (Fuel Cell)]

As described above, the water content of the portion of the anode 4a which faces the fuel gas channel 8 is less than that of the portion of the anode 4a which contacts the first rib 11. In particular, in a case where the fuel cell stack 61 is operated under conditions of a high-temperature and a low humidity (a dew point of the fuel gas flowing through the fuel gas channel 8 and a dew point of the oxidizing gas flowing through the oxidizing gas channel 9 are lower than a temperature of a cooling medium (in this embodiment water) flowing through the cooling medium channel 100, water generated through a reaction of the reaction gases is not sufficient in the portion of the anode 4a which faces the upstream portion 18b of the fuel gas channel 8, when viewed in the thickness direction of the anode separator 6a, and its water content is less. For this reason, the portion of the polymer electrolyte membrane 1 which faces the upstream portion 18b of the fuel gas channel 8 is likely to get dried and be degraded.

However, in the fuel cell 100 and the fuel cell stack 61 including the fuel cell 100 according to Embodiment 1, a ratio of a widthwise portion of the upstream portion 18b of the fuel gas channel 8 which overlaps with the second rib portion 12 of the cathode separator 6b, when viewed in the thickness direction of the anode separator 6a, with respect to an overall width of the fuel gas channel 8 (a ratio of a fuel gas channel width to the second rib portion 12) is set larger than a ratio of a fuel gas channel width of the downstream portion 18c of the fuel gas channel 8 to the second rib portion 12.

To be specific, in Embodiment 1, the upstream portion 18b of the fuel gas channel 8 overlaps with the second rib portion 12 formed on the cathode separator 6b in the channel width direction when viewed in the thickness direction of the anode separator 6a, the fuel gas channel width of the upstream portion 18b of the fuel gas channel 8 to the second rib portion 21 is set to the predetermined ratio, i.e., 1, while the downstream portion 18c of the fuel gas channel does not overlap with the second rib portion 12 of the cathode separator 6b in the channel width direction when viewed in the thickness direction of the anode separator 6a, and a ratio of the fuel gas channel width of the downstream portion 18c of the fuel gas channel 8 to the second rib portion 12 is set to 0.

In the above configuration, water shifts from the portion of the cathode 4b which contacts the second rib portion 12 to the portion of the anode 4a which faces the upstream portion 18a of the fuel gas channel 8, it is possible to suppress a portion of the polymer electrolyte membrane 1 which faces the upstream portion 18b of the fuel gas channel 8 from getting dried and from being degraded. Furthermore, a portion where the first rib portion 11 and the second rib portion 12 overlap with each other and a portion where the first rib portion 11 and the second rib portion 12 do not overlap with each other when viewed in the thickness direction of the anode separator 6a are formed uniformly, thereby suppressing a pressure from being applied unevenly to the polymer electrolyte membrane 1. As a result, degradation of the polymer electrolyte membrane 1 can be suppressed.

In the fuel cell 100 and the fuel cell stack 61 including the fuel cell 100 according to Embodiment 1, the downstream portion 18c of the fuel gas channel 8 is formed, and the first rib portion 11 formed between the reciprocating portions 8a running along the oxidizing gas channel 9 overlaps with the second rib portion 12 formed between the reciprocating portions 9a of the oxidizing gas channel 9, it is possible to suppress a stress from concentrating on portions of the anode 4a and the cathode 4b in the MEA 5 which contact an end portion of the first rib portion 11 and an end portion of the second rib portion 12, respectively, and hence suppress a mechanical stress from being applied to the polymer electrolyte membrane 1. As a result, it is possible to suppress the polymer electrolyte membrane 1 from being degraded due to a mechanical stress.

Although in Embodiment 1, the fuel gas channel 8 and the oxidizing gas channel 9 are each formed to have a serpentine shape, the present invention is not limited to this, but only the fuel gas channel 8 may be formed in a serpentine shape or only the oxidizing gas channel 9 may be formed in a serpentine shape.

Embodiment 2

Figure 5:
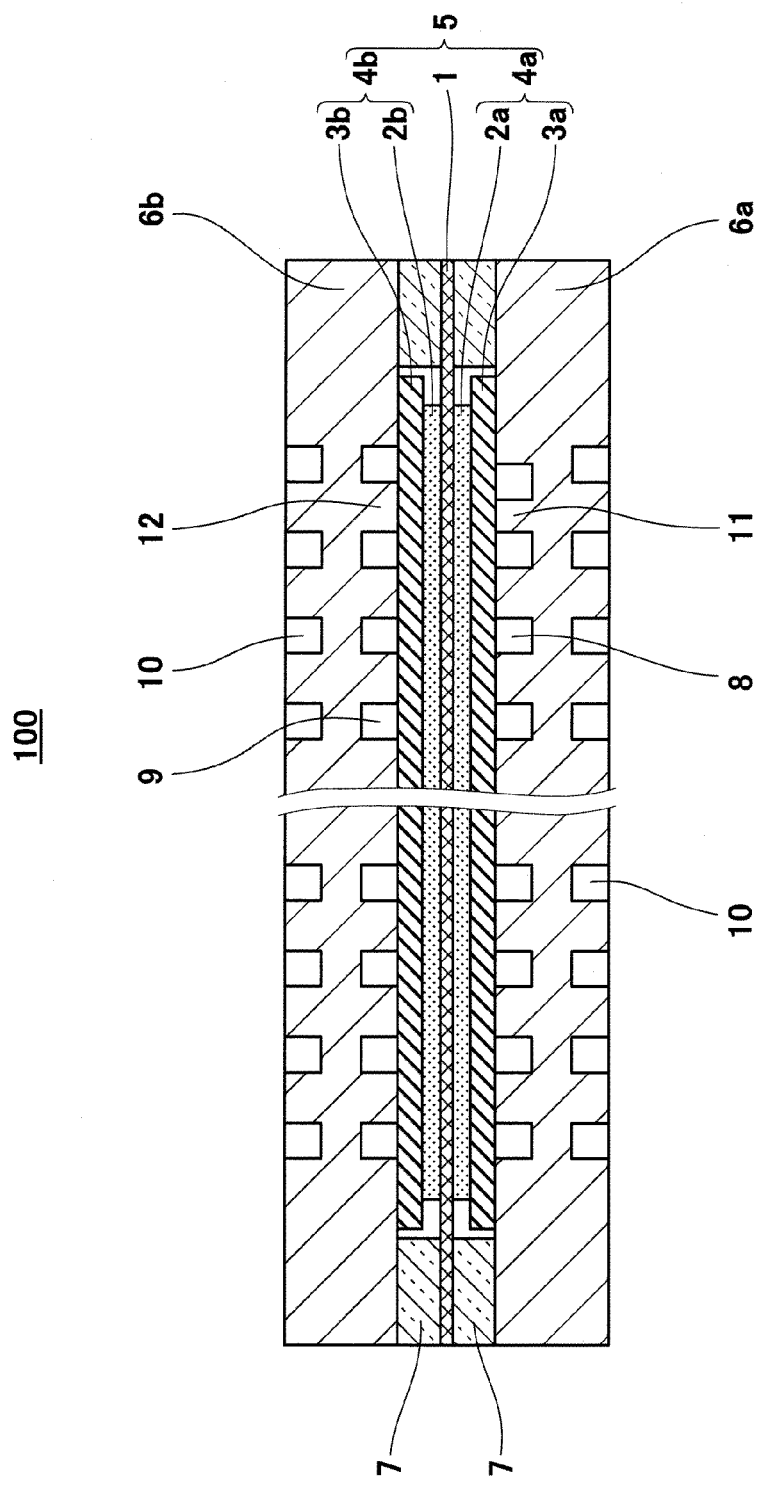
FIG. 5 is a cross-sectional view schematically showing a configuration of a polymer electrolyte fuel cell in a fuel cell stack according to Embodiment 2 of the present invention.
Figure 6:
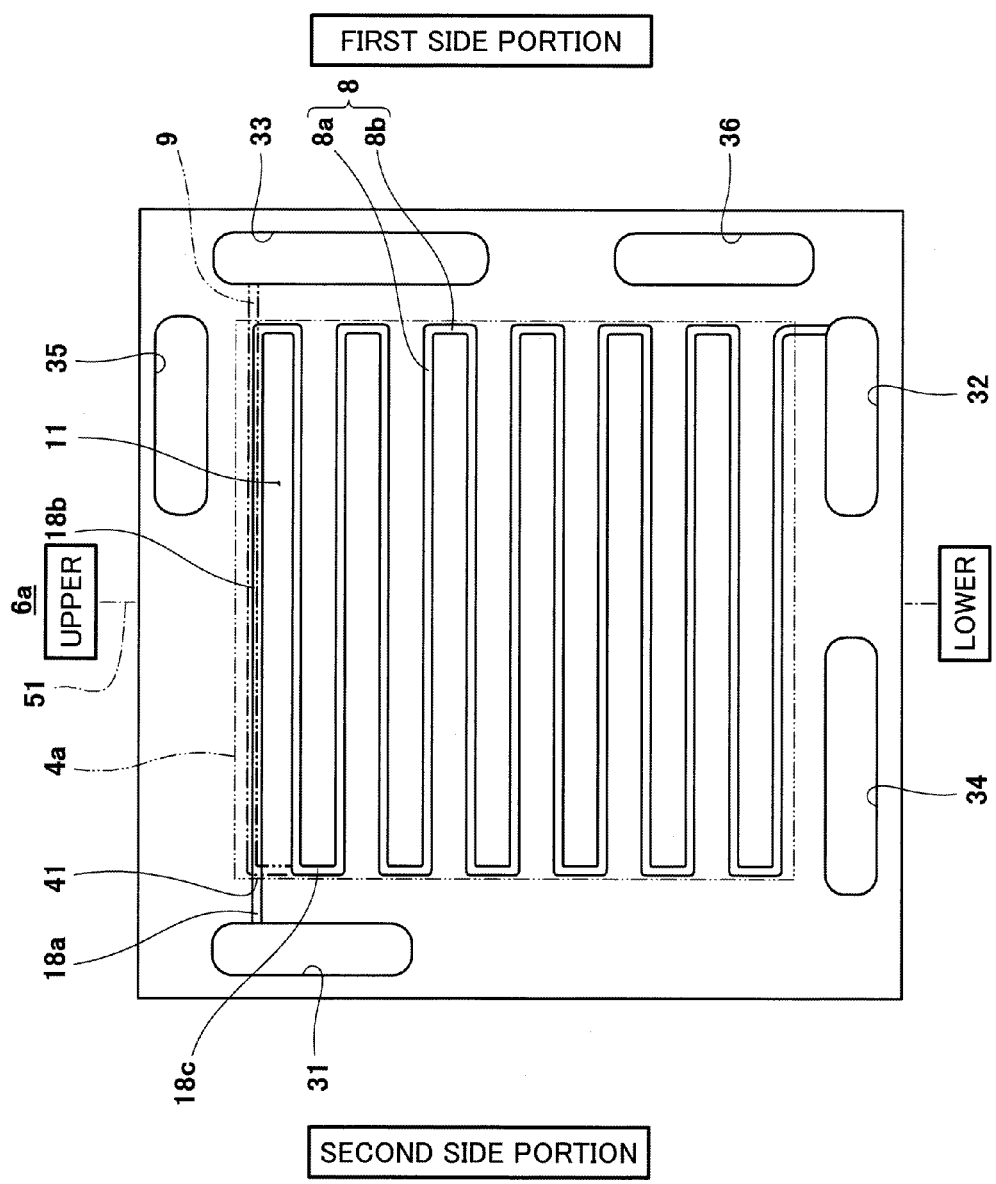
FIG. 6 is a schematic view showing a configuration of an inner surface of an anode separator of the polymer electrolyte fuel cell of FIG. 5.

FIG. 5 is a cross-sectional view schematically showing a configuration of a polymer electrolyte fuel cell (hereinafter simply referred to as fuel cell) in a fuel cell stack according to Embodiment 2 of the present invention. FIG. 6 is a schematic view showing a configuration of an inner surface of an anode separator of the fuel cell of FIG. 5. In FIG. 5, a part of the configuration is omitted. In FIG. 6, upper and lower sides of the anode separator are expressed as upper and lower sides in FIG. 6, and a part of the oxidizing gas channel is expressed as imaginary lines (two-dotted line).

As shown in FIGS. 5 and 6, a fuel cell stack (fuel cell 100) according to Embodiment 2 of the present invention has basically the same configuration as that of the fuel cell stack 61 (fuel cell 100) of Embodiment 1 but is different from the same in that a part of the upstream portion 18b of the fuel gas channel 8 overlaps with the oxidizing gas channel 9 when viewed in the thickness direction of the anode separator 6a.

To be specific, a widthwise (vertical) upper half portion of the upstream portion 18b of the fuel gas channel 8 overlaps with the oxidizing gas channel 9 when viewed in the thickness direction of the anode separator 6a, while a widthwise (vertical) lower half portion of the upstream portion 18b of the fuel gas channel 8 overlaps with the second rib portion 12 of the cathode separator 6b, when viewed in the thickness direction of the anode separator 6a. In other words, a ratio of the fuel gas channel width of the upstream portion 18b of the fuel gas channel 8 to the second rib portion 12 is ½.

In the fuel cell stack 61 (fuel cell 100) according to Embodiment 2 configured as described above, also, in a portion facing the portion (in this embodiment, lower half portion of the upstream portion 18b of the fuel gas channel 8) where the upstream portion 18b of the fuel gas channel 8 overlaps with the second rib portion 21 of the cathode separator 6b, when viewed in the thickness direction of the anode separator 6a, advantages as those of the fuel cell stack 61 (fuel cell 100) according to Embodiment 1 can be achieved.

In the fuel cell stack 61 (fuel cell 100) according to Embodiment 2, since the fuel gas channel width of the upstream portion 18b of the fuel gas channel 8 to the second rib portion 12 is set to the predetermined ratio, i.e., ½, it is possible to suppress a pressure from being applied unevenly to the polymer electrolyte membrane 1 and to suppress the polymer electrolyte membrane 1 from being degraded, like the fuel cell stack 61 (fuel cell 100) according to Embodiment 1.

Furthermore, in the fuel cell stack (fuel cell 100) of the fuel cell stack 61 according to Embodiment 2, since the downstream portion 18c of the fuel gas channel 8 is formed similarly to the downstream portion 18c of the fuel gas channel 8 in the fuel cell stack 61 (fuel cell 100) of the fuel cell stack 61 according to Embodiment 1, advantages as those of the fuel cell stack 61 (fuel cell 100) according to Embodiment 1 can be achieved.

Embodiment 3

Figure 7:
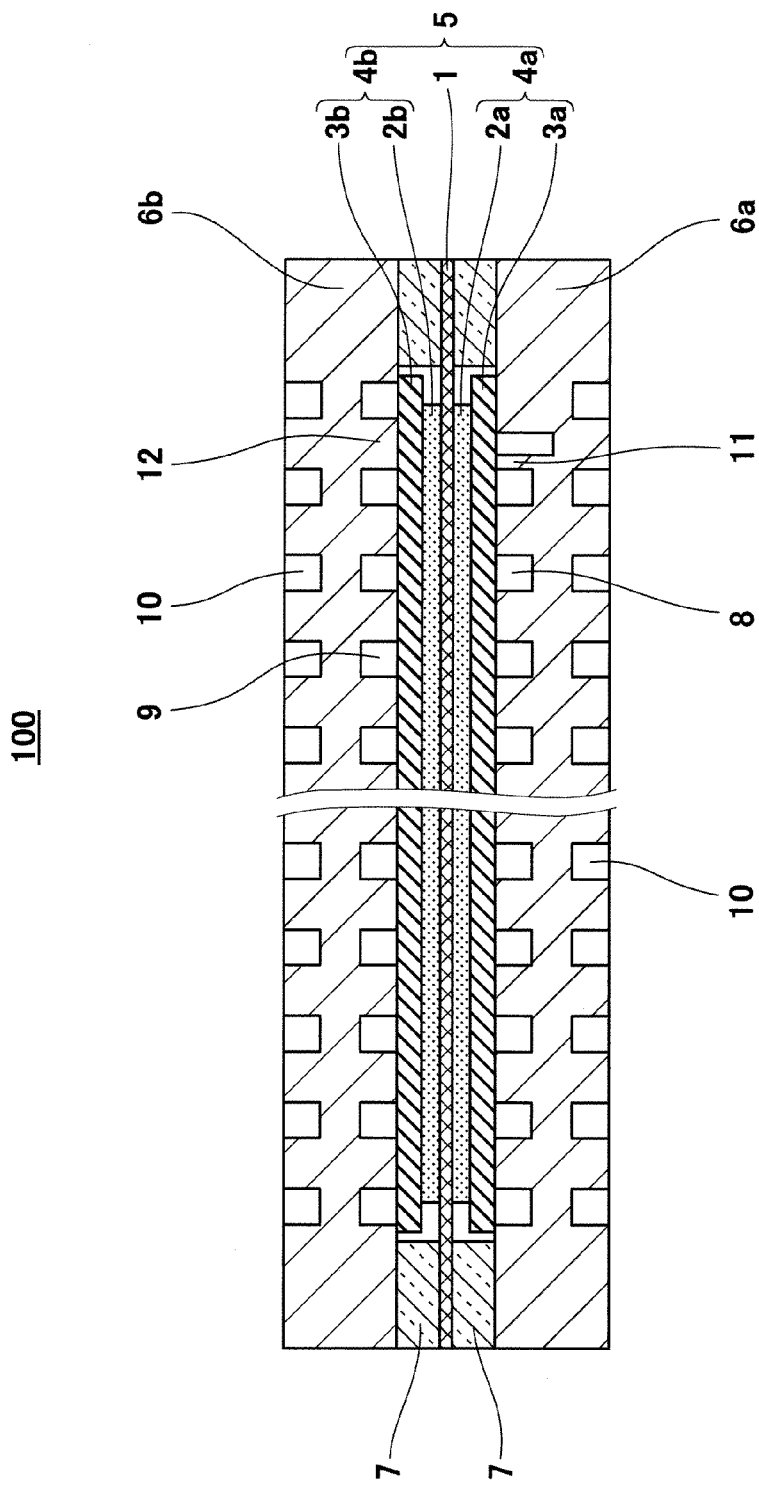
FIG. 7 is a cross-sectional view schematically showing a configuration of a polymer electrolyte fuel cell in a fuel cell stack according to Embodiment 3 of the present invention.
Figure 8:
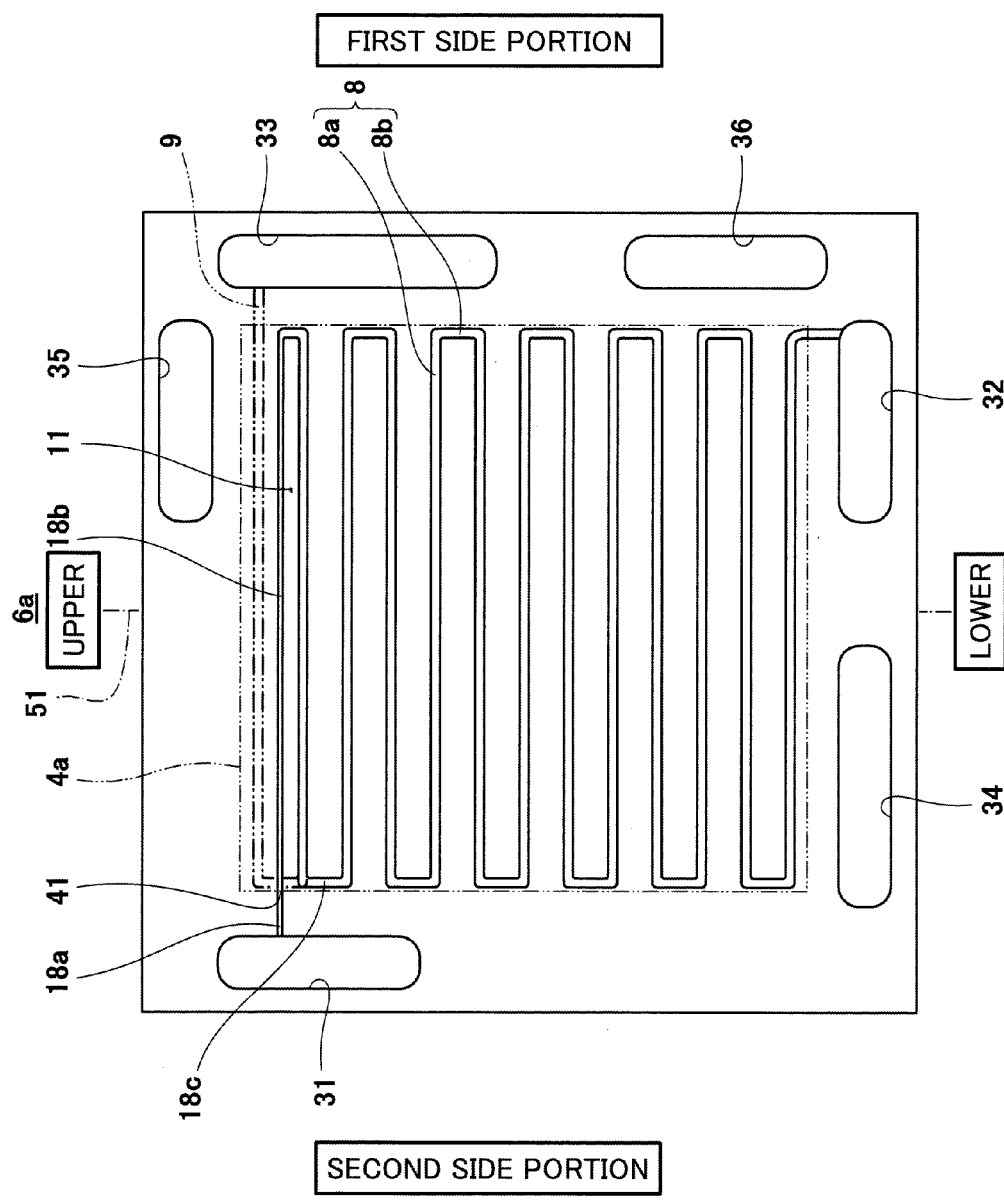
FIG. 8 is a schematic view showing a configuration of an inner surface of an anode separator of the polymer electrolyte fuel cell of FIG. 7.

FIG. 7 is a cross-sectional view schematically showing a configuration of a polymer electrolyte fuel cell (hereinafter simply referred to as fuel cell) in a fuel cell stack according to Embodiment 3 of the present invention. FIG. 8 is a schematic view showing a configuration of an inner surface of an anode separator of the fuel cell of FIG. 7. In FIG. 7, a part of the configuration is omitted. In FIG. 8, upper and lower sides of the anode separator are expressed as upper and lower sides in FIG. 8, and a part of the oxidizing gas channel is expressed as imaginary lines (two-dotted line).

As shown in FIGS. 7 and 8, a fuel cell stack 61 (fuel cell 100) according to Embodiment 3 of the present invention has basically the same configuration as that of the fuel cell stack 61 (fuel cell 100) according to Embodiment 1 but is different from the same in that a channel width of the most-upstream portion 18a and a channel width of the upstream portion 18b in the fuel gas channel 8 are set smaller than a channel width of the downstream portion 18c in the fuel gas channel 8.

To be specific, the channel width of the most-upstream portion 18a and the channel width of the upstream portion 18b in the fuel gas channel 8 are each constant and smaller than the channel width of the downstream portion 18c in the fuel gas channel 8. A channel depth of the most-upstream portion 18a and a channel depth of the upstream portion 18b in the fuel gas channel 8 are set larger than a channel depth of the downstream portion 18c. A cross-sectional area (hereinafter simply referred to as a channel cross-sectional area) of a groove constituting the most-upstream portion 18a and a cross-sectional area of a groove constituting the upstream portion 18b, in a direction perpendicular to a flow of the fuel gas, is substantially equal to a channel cross-sectional area of the downstream portion 18c. This makes a pressure loss equal between the most-upstream portion 18a and the upstream portion 18b in the fuel gas channel 8, and the downstream portion 18c in the fuel gas channel 8. As a result, the fuel gas flows substantially at an equal flow rate in the most-upstream portion 18a and the upstream portion 18b, and the downstream portion 18c in the fuel gas channel 8.

Although the channel width of the most-upstream portion 18a is equal to the channel width of the upstream portion 18b in the fuel gas channel 8, the present invention is not limited to this, but the channel width of the most-upstream portion 18a may be equal to the channel width of the downstream portion 18c, or the channel width of the upstream portion 18b may be varied. In a further alternative, the channel width of the upstream portion of the oxidizing gas channel 9 may be made smaller than the channel width of the downstream portion of the oxidizing gas channel 9.

In the fuel cell stack 61 (fuel cell 100) according to Embodiment 3, advantages as those of the fuel cell stack 61 (fuel cell 100) according to Embodiment 1 can be achieved.

In the fuel cell stack 61 (fuel cell 100) according to Embodiment 3, since the channel width of the upstream portion 18b of the fuel gas channel 8 is made smaller, the portion of the anode 4a which faces the upstream portion 18b of the fuel gas channel 8, when viewed in the thickness direction of the anode separator 6a, can be made smaller, and thus, a region where a water content is less can be reduced. Because of this, the portion of the polymer electrolyte membrane 1 which faces the upstream portion 18b of the fuel gas channel 8 when viewed in the thickness direction of the anode separator 6a, can be reduced. Thus, it is possible to suppress the polymer electrolyte membrane 1 from getting dried and from being degraded more effectively.

In the fuel cell stack (fuel cell 100) according to Embodiment 3, since the channel cross-sectional area of the most-upstream portion 18a and the channel cross-sectional area of the upstream portion 18b in the fuel gas channel 8 are substantially equal to the channel cross-sectional area of the downstream portion 18c in the fuel gas channel 8, a pressure loss is equal in the most-upstream portion 18a and the upstream portion 18b, and the downstream portion 18c in the fuel gas channel 8. As a result, the fuel gas flows substantially at an equal flow rate in the most-upstream portion 18a and the upstream portion 18b, and the downstream portion 18c in the fuel gas channel 8, can be made substantially equal, thus maintaining power generation performance.

Embodiment 4

Figure 9:
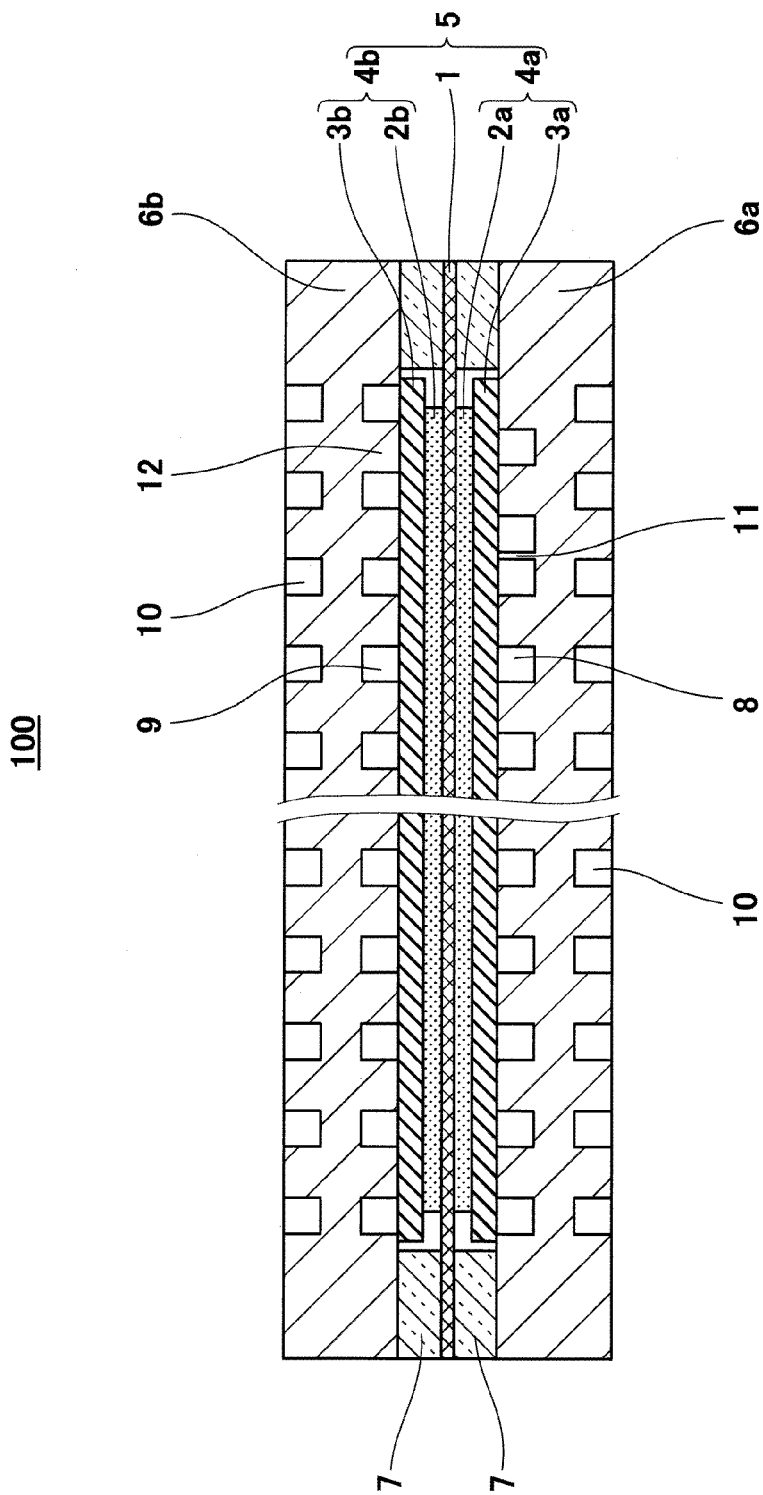
FIG. 9 is a cross-sectional view schematically showing a configuration of a polymer electrolyte fuel cell in a fuel cell stack according to Embodiment 4 of the present invention.
Figure 10:
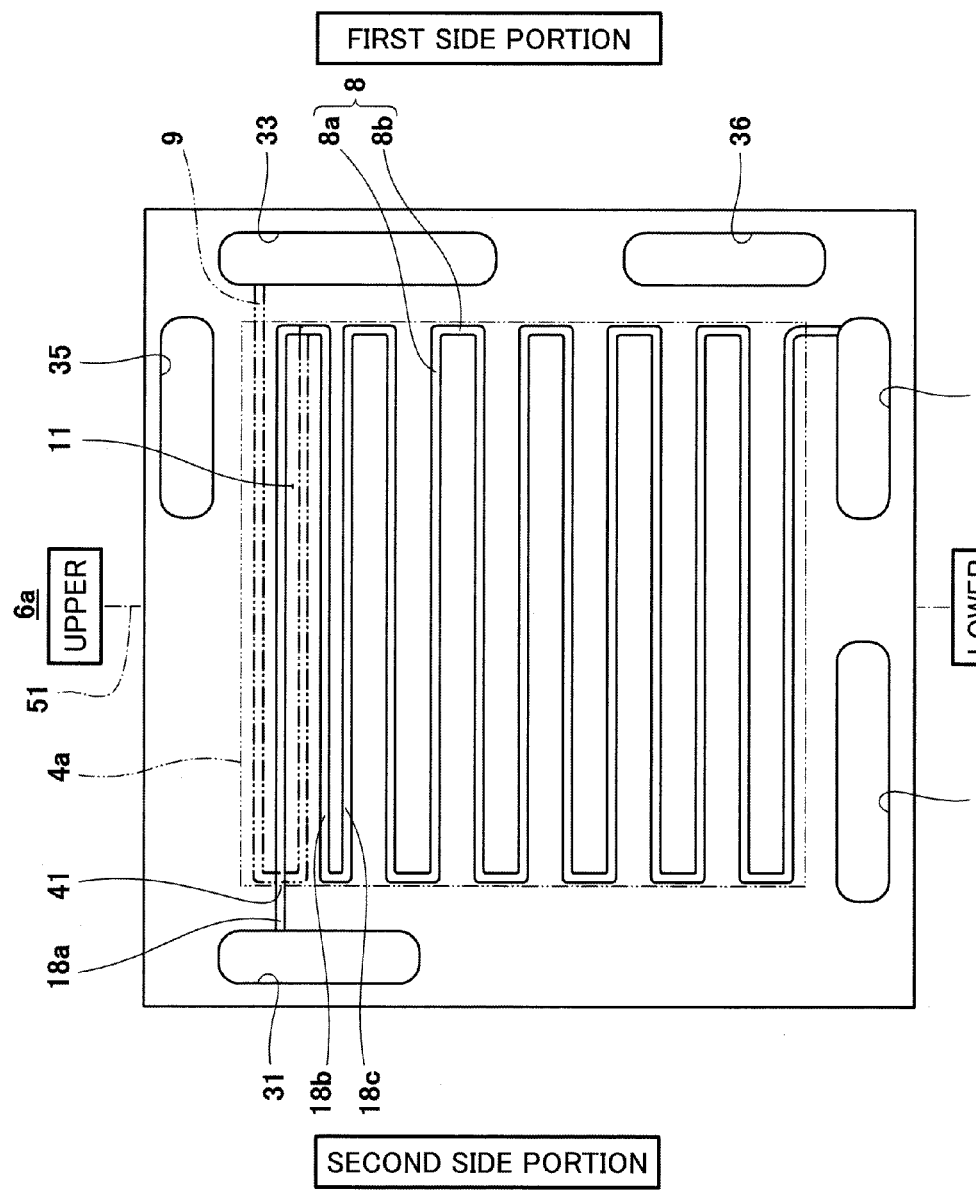
FIG. 10 is a schematic view showing a configuration of an inner surface of an anode separator of the polymer electrolyte fuel cell of FIG. 9.

FIG. 9 is a cross-sectional view schematically showing a configuration of a polymer electrolyte fuel cell (hereinafter simply referred to as fuel cell) in a fuel cell stack according to Embodiment 4 of the present invention. FIG. 10 is a schematic view showing a configuration of an inner surface of an anode separator of the fuel cell of FIG. 9. In FIG. 9, a part of the configuration is omitted. In FIG. 10, upper and lower sides of the anode separator are expressed as upper and lower sides in FIG. 10, and a part of the oxidizing gas channel is expressed as imaginary lines (two-dotted line).

As shown in FIGS. 9 and 10, a fuel cell stack 61 (fuel cell 100) according to Embodiment 4 of the present invention has basically the same configuration as that of the fuel cell stack 61 (fuel cell 100) according to Embodiment 1, but is different from the same in that an opposite end of the upstream portion 18b of the fuel gas channel 8 is a downstream end of a second reciprocating portion 8a from upstream side. To be specific, the upstream portion 18b of the fuel gas channel 8 extends from the portion 41 of the fuel gas channel 8 a certain distance horizontally toward the first side portion, then extends a certain distance downward, and then extends a certain distance horizontally toward the second portion.

In the upstream portion 18b of the fuel gas channel 8 in the fuel cell stack 61 (fuel cell 100) according to Embodiment 4, a first reciprocating portion 8a from upstream side overlaps with a second rib portion 12 formed between a first reciprocating portion 9a and a second reciprocating portion 9a from upstream side in the oxidizing gas channel 9 when viewed in the thickness direction of the anode separator 6a, while a second reciprocating portion 8a from upstream side overlaps with a second rib portion 12 formed between the second reciprocating portion 9a and a third reciprocating portion 9a from upstream side in the oxidizing gas channel 9 when viewed in the thickness direction of the anode separator 6a.

In the fuel cell stack 61 (fuel cell 100) according to Embodiment 4 configured as described above, advantages as those of the fuel cell stack 61 (fuel cell 100) according to Embodiment 1 can be achieved.

Embodiment 5

Figure 11:
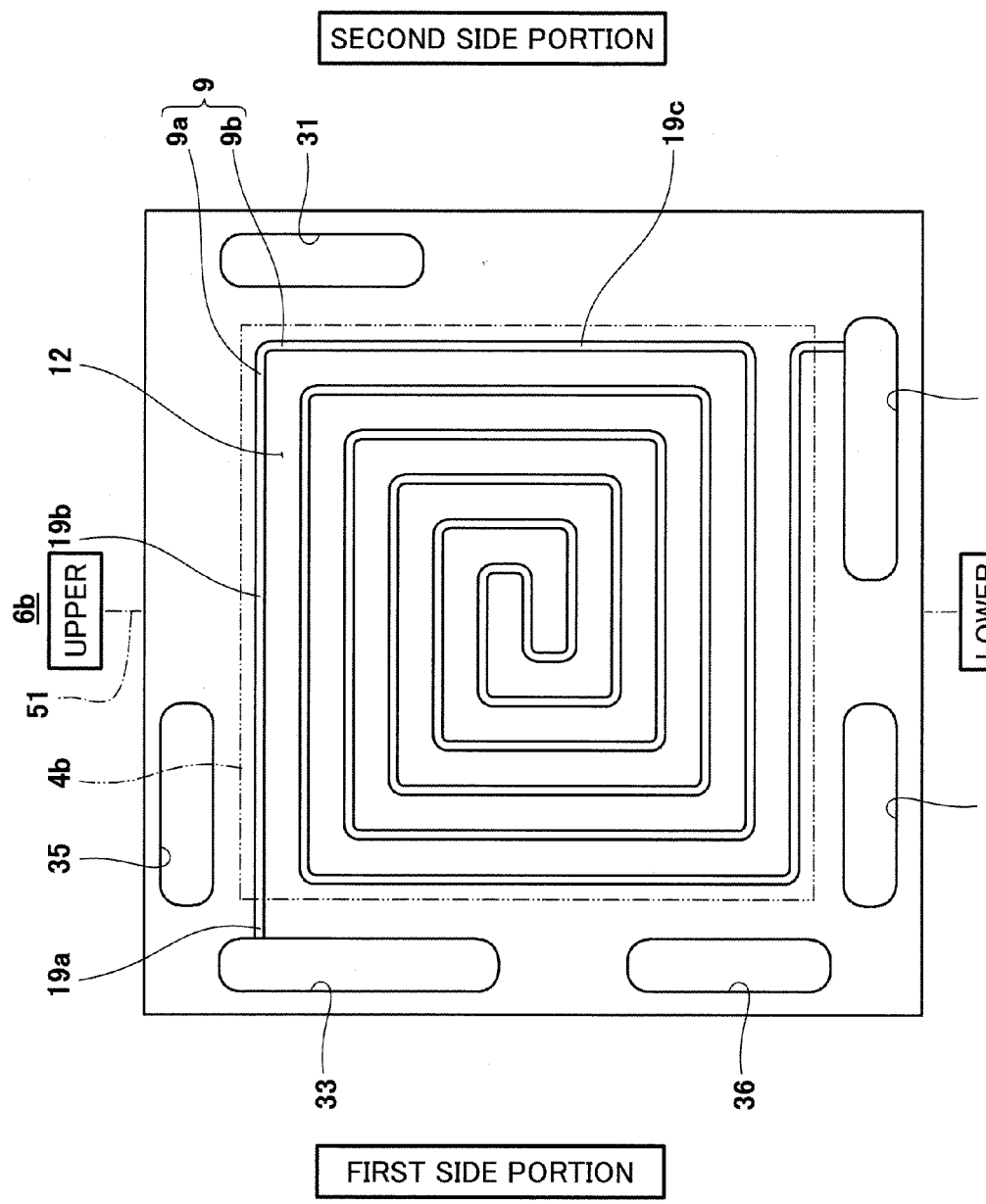
FIG. 11 is a schematic view showing a configuration of an inner surface of a cathode separator of a fuel cell stack (polymer electrolyte fuel cell) according to Embodiment 5 of the present invention.
Figure 12:
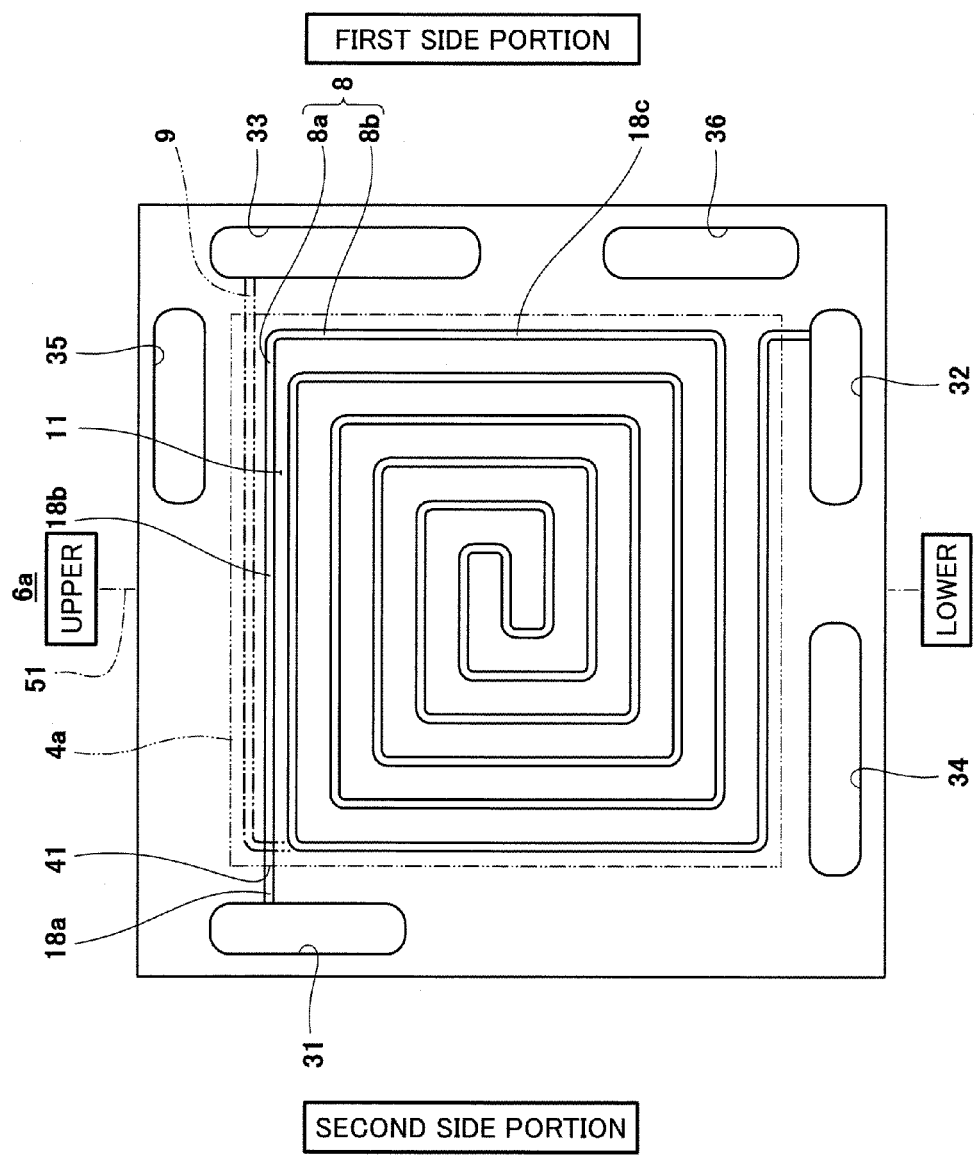
FIG. 12 is a schematic view showing a configuration of an inner surface of an anode separator of a fuel cell stack (polymer electrolyte fuel cell) according to Embodiment 5 of the present invention.

FIG. 11 is a schematic view showing a configuration of an inner surface of a cathode separator of a fuel cell stack (polymer electrolyte fuel cell, (hereinafter simply referred to as fuel cell)) according to Embodiment 5 of the present invention. FIG. 12 is a schematic view showing a configuration of an inner surface of an anode separator of the fuel cell stack (fuel cell) according to Embodiment 5 of the present invention. In FIGS. 11 and 12, upper and lower sides of the cathode separator and the anode separator are expressed as upper and lower sides in FIGS. 11 and 12.

As shown in FIGS. 11 and 12, the fuel cell stack 61 (fuel cell 100) according to Embodiment 5 of the present invention has basically the same configuration as that of the fuel cell stack 61 (fuel cell 100) according to Embodiment 1 but is different from the same in that the fuel gas channel 8 has a spiral shape and the oxidizing gas channel 9 has a spiral shape. Since the oxidizing gas channel 9 is configured similarly to the fuel gas channel 8, the fuel gas channel 8 will be described hereinafter.

As shown in FIG. 12, the fuel gas channel 8 is substantially composed of a horizontal portion 8a extending horizontally and a vertical portion 8b extending vertically. The channel extends clockwise such that it converges from a peripheral portion of the anode separator 6a toward a center portion, turns back at the center portion of the anode separator 6a and diverges toward the peripheral portion of the anode separator 6a. As used herein, the center portion of the anode separator 6a refers to a center portion relative to an outer periphery of the anode separator 6a.

The upstream portion 18b of the fuel gas channel 8 is formed by a channel extending between the first portion 41 of the fuel gas channel 8 which contacts the anode 4a first from an upstream end and a terminal end of a portion extending horizontally toward the first side portion (in other words, the upstream portion 18b is a portion extending from the portion 41 of the fuel gas channel 8 to a downstream end of a first horizontal portion 8a). The upstream portion 18b of the fuel gas channel 8 overlaps with a second rib portion 12 formed between a first horizontal portion 9a from upstream side in the oxidizing gas channel 9 and a horizontal portion 9a below and adjacent to the first horizontal portion 9a, when viewed in the thickness direction of the anode separator 6a.

In the fuel cell stack 61 (fuel cell 100) according to Embodiment 5 configured as described above, advantages as those of the fuel cell stack 61 (fuel cell 100) according to Embodiment 1 can be achieved.

Although in Embodiment 5, the fuel gas channel 8 has a spiral shape and the oxidizing gas channel 9 has a spiral shape, the present invention is not limited to this, but only the fuel gas channel 8 may have a spiral shape, or only the oxidizing gas channel 9 may have a spiral shape.

Embodiment 6

Figure 13:
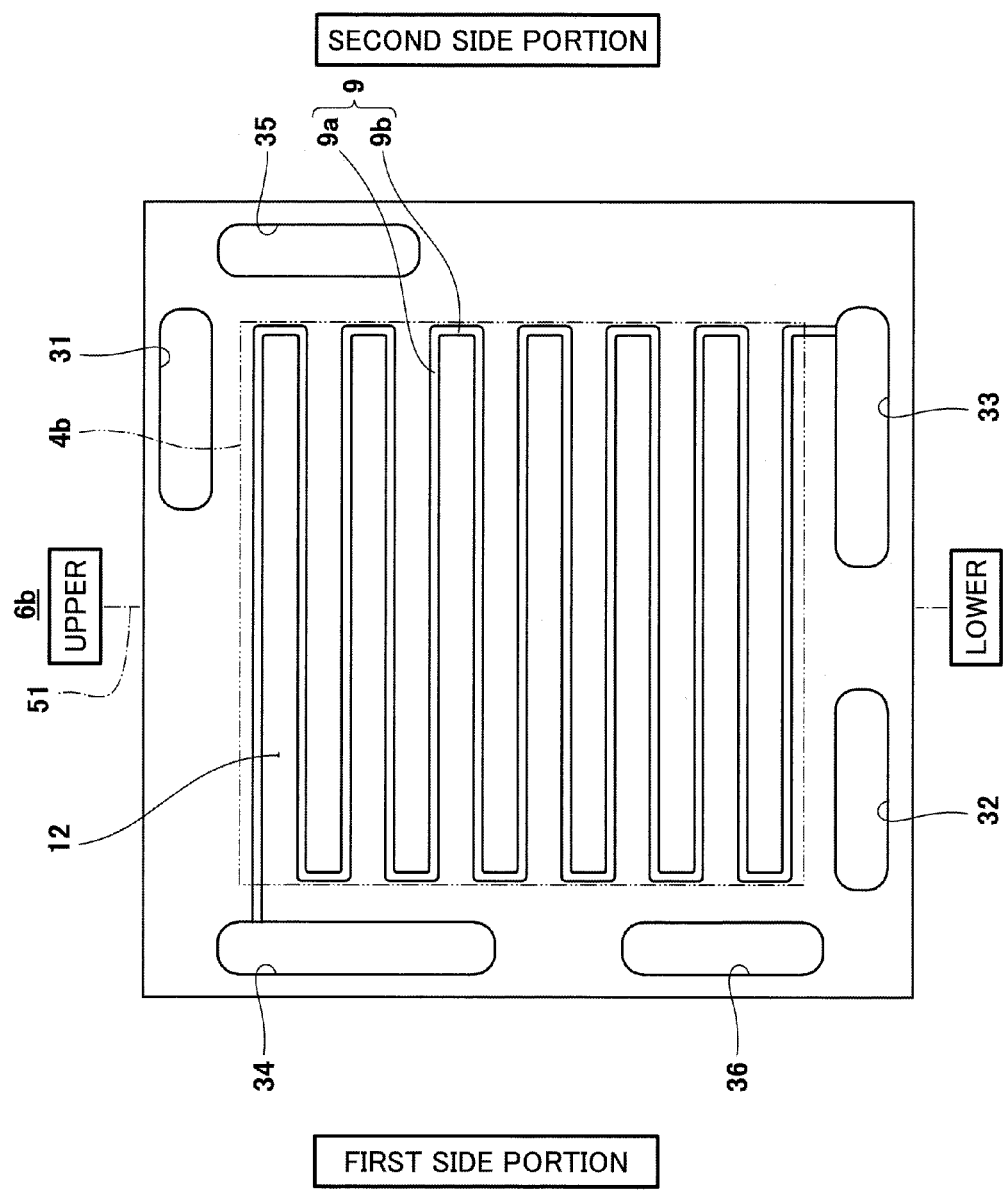
FIG. 13 is a schematic view showing a configuration of an inner surface of a cathode separator of a fuel cell stack (polymer electrolyte fuel cell) according to Embodiment 6 of the present invention.
Figure 14:
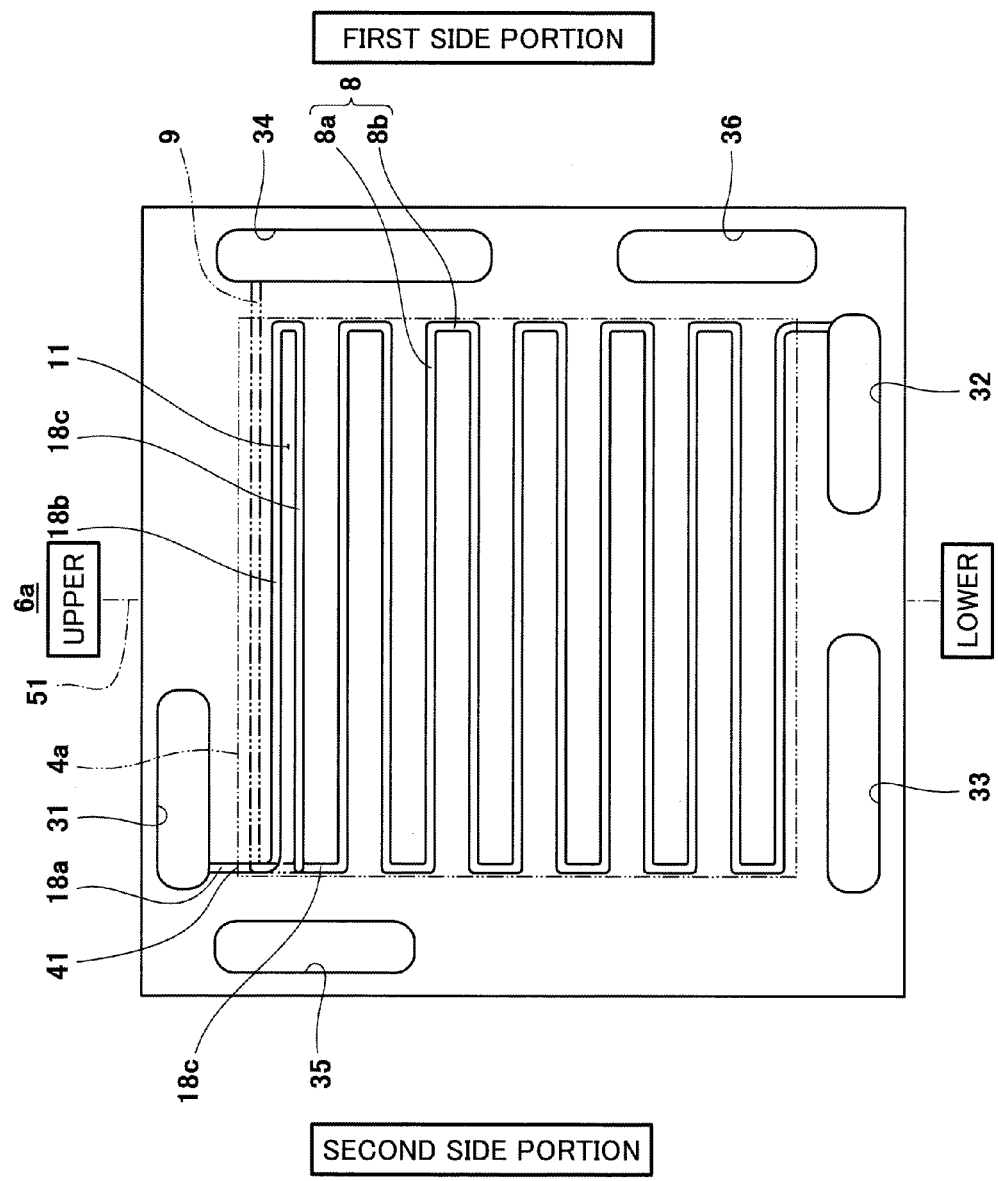
FIG. 14 is a schematic view showing a configuration of an inner surface of an anode separator of a fuel cell stack (polymer electrolyte fuel cell) according to Embodiment 6 of the present invention.
Figure 15:
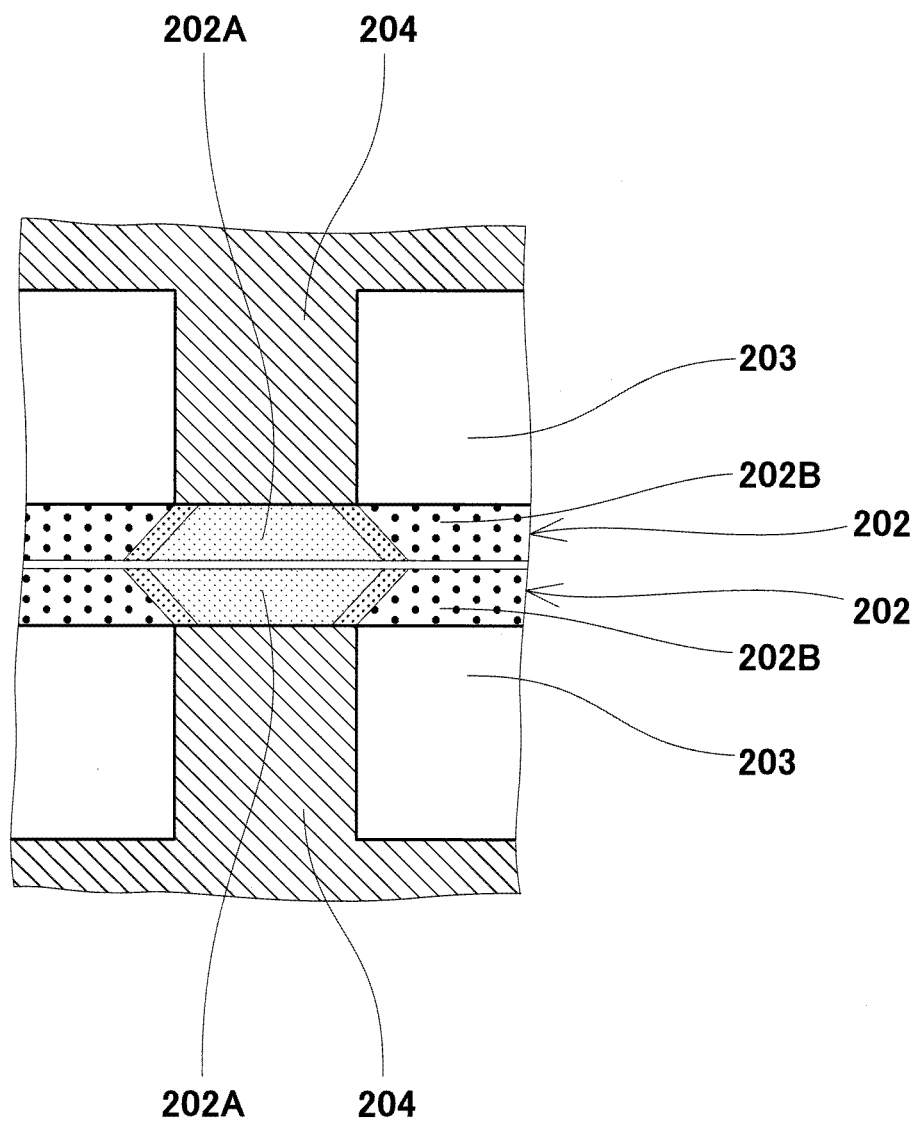
FIG. 15 is a schematic view showing a water content in an electrode during an operation of a fuel cell.

FIG. 13 is a schematic view showing a configuration of an inner surface of a cathode separator of a fuel cell stack (polymer electrolyte fuel cell, (hereinafter simply referred to as fuel cell)) according to Embodiment 6 of the present invention. FIG. 14 is a schematic view showing a configuration of an inner surface of an anode separator of the fuel cell stack (fuel cell) according to Embodiment 6 of the present invention. In FIGS. 13 and 14, upper and lower sides of the cathode separator and the anode separator are expressed as upper and lower sides in FIGS. 13 and 14.

As shown in FIGS. 13 and 14, a fuel cell stack 61 (fuel cell 100) according to Embodiment 6 of the present invention has basically the same configuration as that of the fuel cell stack 61 (fuel cell 100) of Embodiment 1 but is different from the same in that the fuel gas channel 8 and the oxidizing gas channel 9 form a so-called counter flow and positions of manifold holes such as the fuel gas supply manifold hole 31 are different. As used herein, the counter flow refers to a configuration in which the fuel gas channel 8 and the oxidizing gas channel 9 have localized regions where the fuel gas and the oxidizing gas run along each other but flow in opposite directions from upstream to downstream macroscopically (as a whole) when viewed in the thickness direction of the anode separator 6a.

The positions of the manifold holes such as the fuel gas supply manifold hole 31 in the anode separator 6a will be described with reference to FIG. 14. Since the positions of the manifold holes such as the fuel gas supply manifold hole 31 in the cathode separator 6b are similar to positions of the manifold holes such as the fuel gas supply manifold hole 31 in the anode separator 6a, they will not be described in detail.

As shown in FIG. 14, at an upper portion of a first side portion of the anode separator 6a, an oxidizing gas exhaust manifold hole 34 is provided, while at a lower portion thereof, a cooling medium discharge manifold hole 36 is provided. At an inner side of the lower portion where the cooling medium discharge manifold hole 36 is provided, a fuel gas exhaust manifold hole 32 is provided. At an upper portion of a second side portion of the anode separator 6a, a cooling medium supply manifold hole 35 is provided, while at a lower portion thereof, an oxidizing gas supply manifold hole 33 is provided. At an inner side of the upper portion where the cooling medium supply manifold hole 35 is provided, the fuel gas supply manifold hole 31 is provided.

The groove forming the fuel gas channel 8 extends a certain distance downward from the fuel gas supply manifold hole 31, then extends a certain distance horizontally toward the first side portion, and then extends a certain distance downward. From that point, the groove extends a certain distance horizontally toward the second side portion. The above extension pattern repeats five times, then the groove extends a certain distance downward, and then extends a certain distance horizontally toward the first side portion. From that point, the groove extends downward and reaches the fuel gas exhaust manifold hole 32.

Since the manifold holes such as the fuel gas supply manifold hole 31 and the fuel gas channel 8 are configured as described above, the upstream portion 18b of the fuel gas channel 8 is configured as follows. To be specific, the upstream portion 18b of the fuel gas channel 8 overlaps with the second rib portion 12 formed between the first reciprocating portion 9a and the second reciprocating portion 9a from downstream side in the oxidizing gas channel 9, when viewed in the thickness direction of the anode separator 6a.

In the fuel cell stack 61 (fuel cell 100) according to Embodiment 6 configured as described above, advantages as those of the fuel cell stack 61 (fuel cell 100) according to Embodiment 1 can be achieved.

Embodiment 7

Figure 16:
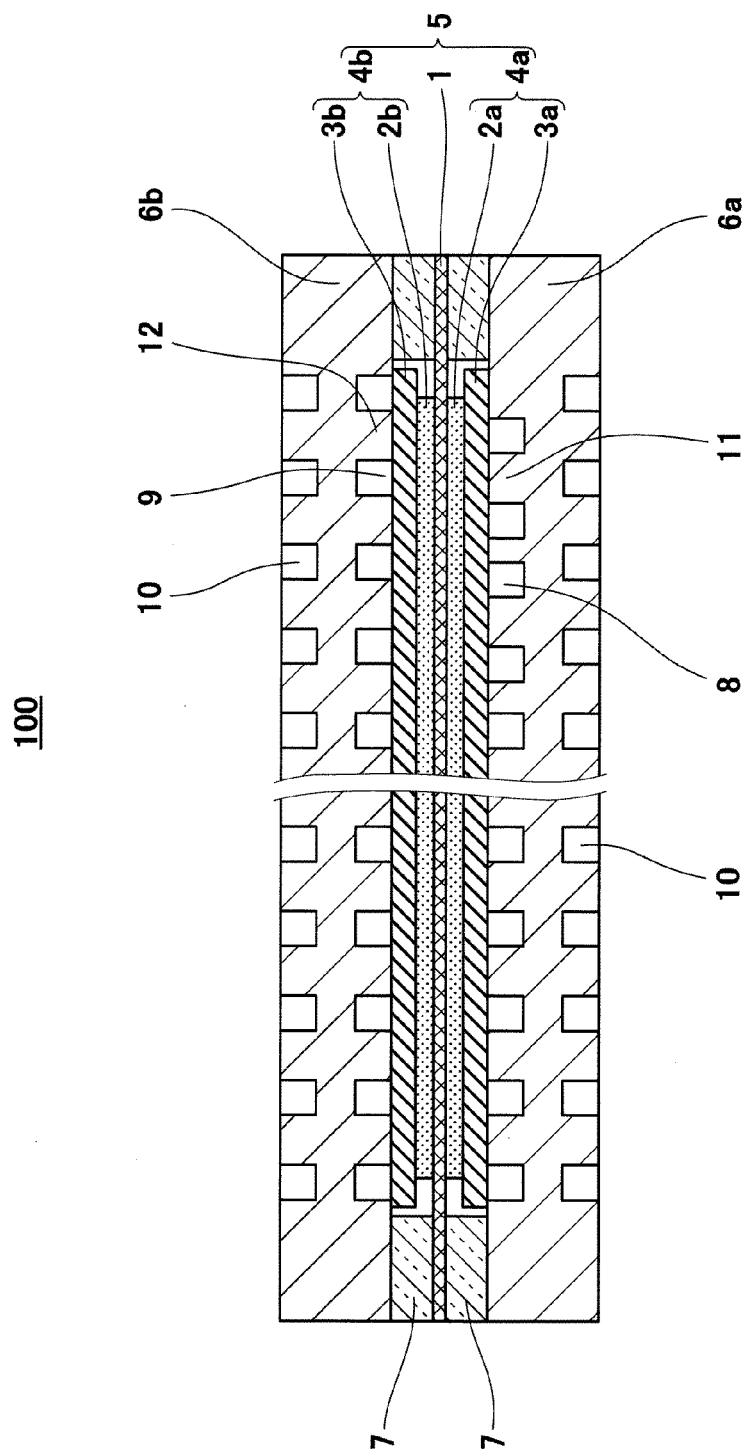
FIG. 16 is a cross-sectional view schematically showing a configuration of a polymer electrolyte fuel cell (hereinafter referred to as fuel cell) in a fuel cell stack according to Embodiment 7 of the present invention.
Figure 17:
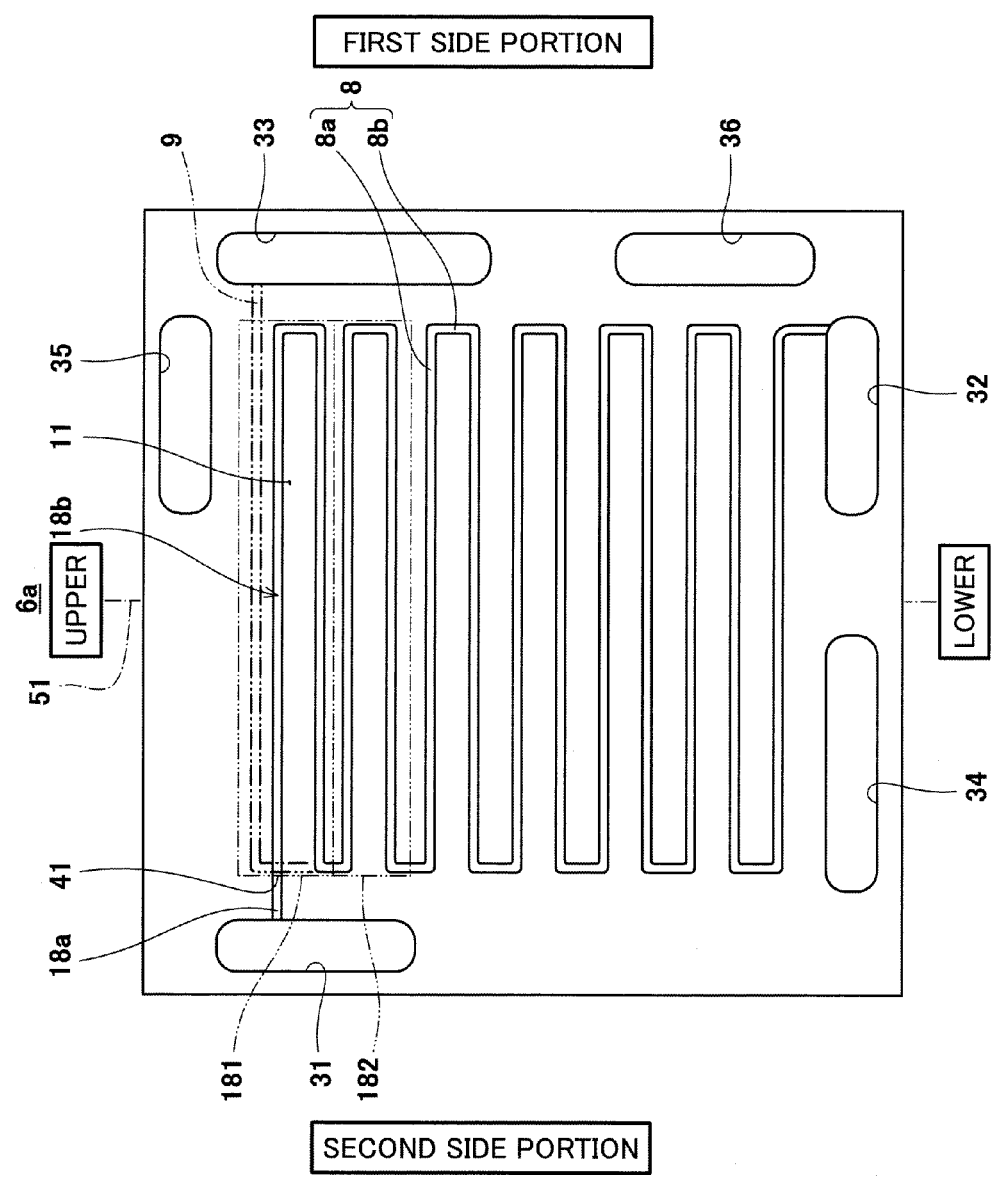
FIG. 17 is a schematic view showing a configuration of an inner surface of an anode separator of the fuel cell of FIG. 16.

FIG. 16 is a cross-sectional view schematically showing a configuration of a polymer electrolyte fuel cell (hereinafter referred to as fuel cell) in a fuel cell stack according to Embodiment 7 of the present invention. FIG. 17 is a schematic view showing a configuration of an inner surface of an anode separator of the fuel cell of FIG. 16. In FIG. 16, a part of the configuration is omitted. In FIG. 17, upper and lower sides of the anode separator are expressed as upper and lower sides in FIG. 17, and a part of the oxidizing gas channel is expressed as imaginary lines (two-dotted line).

As shown in FIGS. 16 and 17, the fuel cell stack 61 (fuel cell 100) according to Embodiment 7 of the present invention has basically the same configuration as that of the fuel cell stack 61 (fuel cell 100) according to Embodiment 1 but is different from the same in that the upstream portion 18b of the fuel gas channel 8 includes a first upstream portion 181 and a second upstream portion 182 (portion surrounded by one-dotted line in FIG. 17), and the first upstream portion 181 is configured not to overlap with the oxidizing gas channel 9 but a part of the second upstream portion 182 is configured to overlap with the oxidizing gas channel 9, when viewed in the thickness direction of the anode separator 6a.

To be specific, the first upstream portion 181 of the upstream portion 18b is composed of a first reciprocating portion 8a from upstream side, a first inverted portion 8b from upstream side and a second reciprocating portion 8a from upstream side. In other words, the first upstream portion 181 is formed by a portion extending a certain distance horizontally from the first portion 41 of the fuel gas channel 8 toward the first side portion, then extends a certain distance downward and then extends horizontally toward the second side portion.

The first upstream portion 181 is configured such that, when viewed in the thickness direction of the anode separator 6a, the first reciprocating portion 8a from upstream side overlaps with the second rib portion 12 formed between a first reciprocating portion 9a and a second reciprocating portion 9a from upstream side in the oxidizing gas channel 9, and the second reciprocating portion 8a from upstream side overlaps with the second rib portion 12 formed between a second reciprocating portion 9a and a third reciprocating portion 9a from upstream side in the oxidizing gas channel 9. In other words, the first upstream portion 181 is configured such that a ratio (first predetermined ratio) of a fuel gas channel width of the first upstream portion 181 to the second rib portion 12 is 1.

The second upstream portion 182 of the upstream portion 18b is composed of a second inverted portion 8b from upstream side, a third reciprocating portion 8a from upstream side, a third inverted portion 8b from upstream side and a fourth reciprocating portion 8a from upstream side. In other words, the second upstream portion 182 is formed by a portion extending a certain distance downward from a downstream end of the first upstream portion, then extends a certain distance horizontally toward the first side portion, then extends a certain distance downward, and then extends a certain distance horizontally toward the second side portion.

The second upstream portion 182 is configured such that widthwise (vertical) upper half portions of the third and fourth reciprocating portions 8a from upstream side, constituting the second upstream portion 182, overlap with the oxidizing gas channel 9, when viewed in the thickness direction of the anode separator 6a, while vertical (widthwise) lower half portions of the third and fourth reciprocating portions 8a from upstream side, constituting the second upstream portion 182, overlap with the second rib portion 12 of the cathode separator 6b, when viewed in the thickness direction of the anode separator 6a. In other words, the second upstream portion 182 is configured such that a ratio (second predetermined ratio) of a fuel gas channel width of the second upstream portion 182 to the second rib portion 12 is ½.

Thus, in the fuel cell stack 61 (fuel cell 100) according to Embodiment 7, the first predetermined ratio is set larger than the second predetermined ratio.

Thus, in the fuel cell stack 61 (fuel cell 100) according to Embodiment 7 configured as described above, in the first upstream portion 181, the same advantages as those of the fuel cell stack 61 (fuel cell 100) according to Embodiment 1 are achieved, while in a portion facing a portion (lower half portion of the second upstream portion 182) of the second upstream portion 182 of the fuel gas channel 8 which overlaps with the second rib portion 12 of the cathode separator 6b, the same advantages as those of the fuel cell stack 61 (fuel cell 100) according to Embodiment 1 are achieved.

In the fuel cell stack 61 (fuel cell 100) according to Embodiment 7, since the ratio of the fuel gas channel width of the first upstream portion 181 of the fuel gas channel 8 to the second rib portion 12 is the predetermined ratio, i.e., 1 and the ratio of the fuel gas channel width of the second upstream portion 182 to the second rib portion 12 is the predetermined ratio, i.e., ½, it is possible to suppress a pressure from being applied unevenly to the polymer electrolyte membrane 1 and hence suppress the polymer electrolyte membrane 1 from being degraded, like the fuel cell stack 61 (fuel cell 100) of Embodiment 1.

In the fuel cell stack 61 (fuel cell 100) according to Embodiment 7, also, since the downstream portion 18c of the fuel gas channel 8 is formed like that of the fuel cell stack 61 (fuel cell 100) according to Embodiment 1, the same advantages as those of the fuel cell stack 61 (fuel cell 100) according to Embodiment 1 are achieved.

Although in Embodiment 7, the first upstream portion 181 of the upstream portion 18b in the fuel gas channel 8 is configured to extend from the portion 41 of the fuel gas channel 8 to the downstream end of the second reciprocating portion 8a from upstream side, the present invention is not limited to this. The first upstream portion 181 may be a portion between the portion 41 which is one end and a portion satisfying a formula: $L7<\{(\frac{2}{3})\times L2\}$ which is an opposite end, although its downstream end is different depending on a configuration such as a width of the fuel gas channel 8, a dew point of the reaction gas, a temperature of the cooling medium, etc. In the formula, L7 indicates a channel length of the first upstream portion 181 of the fuel gas channel 8, and L2 indicates an overall channel length of the fuel gas channel 8. The opposite end of the first upstream portion 181 is more preferably a portion satisfying a formula $L7 \leq L2$ and most preferably a formula: $L7 \leq \{(\frac{1}{3})\times L2\}$.

Although the second upstream portion 182 of the upstream portion 18b in the fuel gas channel 8 is formed by the portion extending from the downstream end of the first upstream portion 181 to the downstream end of the fourth reciprocating portion 8a from upstream side, the present invention is not limited to this. The second upstream portion 182 may be a portion between the downstream end of the first upstream portion 181 which is one end and the portion satisfying a formula: $L8 \leq \{(\frac{2}{3})\times L2\}$ which is an opposite end, although its downstream end is different depending on a configuration such as a width of the fuel gas channel 8, a dew point of the reaction gas, a temperature of the cooling medium, etc. In the formula, L8 indicates a channel length of the second upstream portion 182 of the fuel gas channel 8, and L2 indicates an overall channel length of the fuel gas channel 8. The opposite end of the second upstream portion 182 is more preferably a portion satisfying a formula: $L8 \leq L2$ and most preferably a formula: $L8 \leq \{(\frac{1}{3})\times L2\}$.

Embodiment 8

Figure 18:
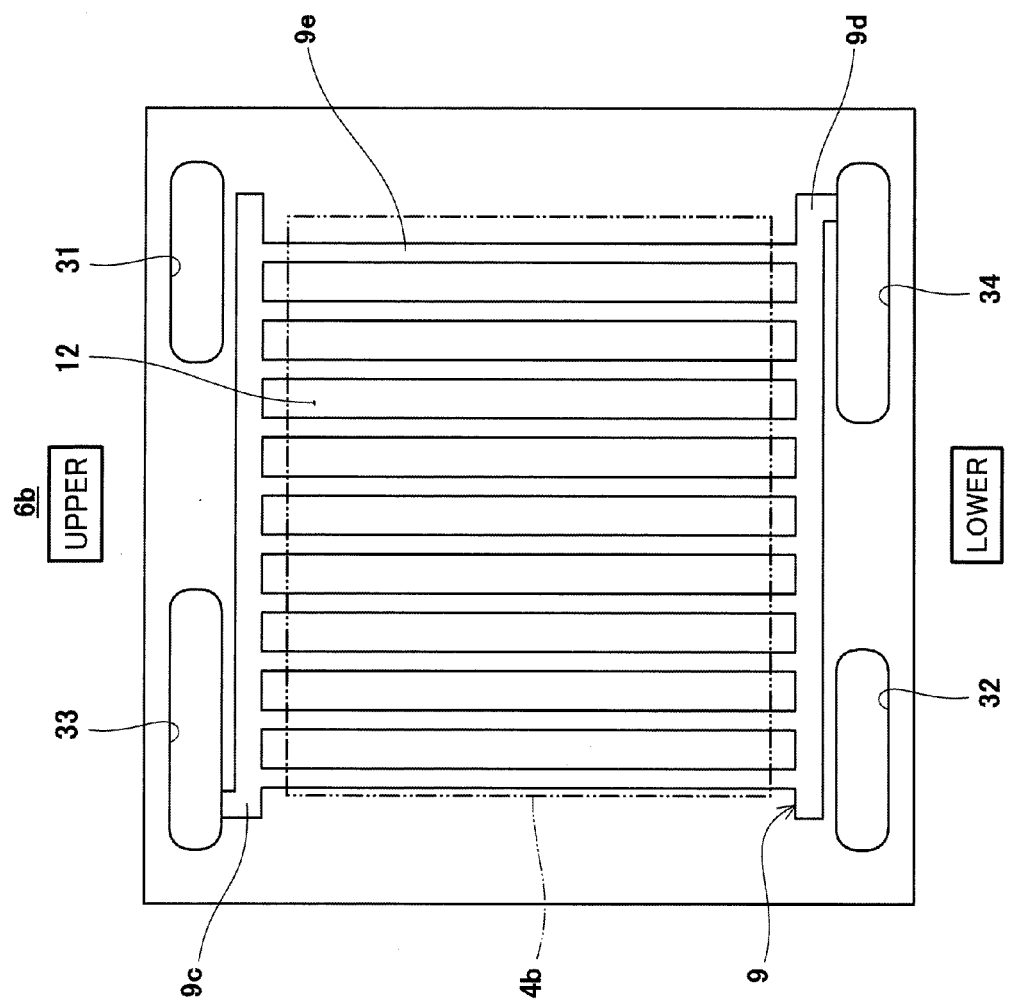
FIG. 18 is a schematic view showing a configuration of an inner surface of a cathode separator of a fuel cell stack according to Embodiment 8 of the present invention.
Figure 19:
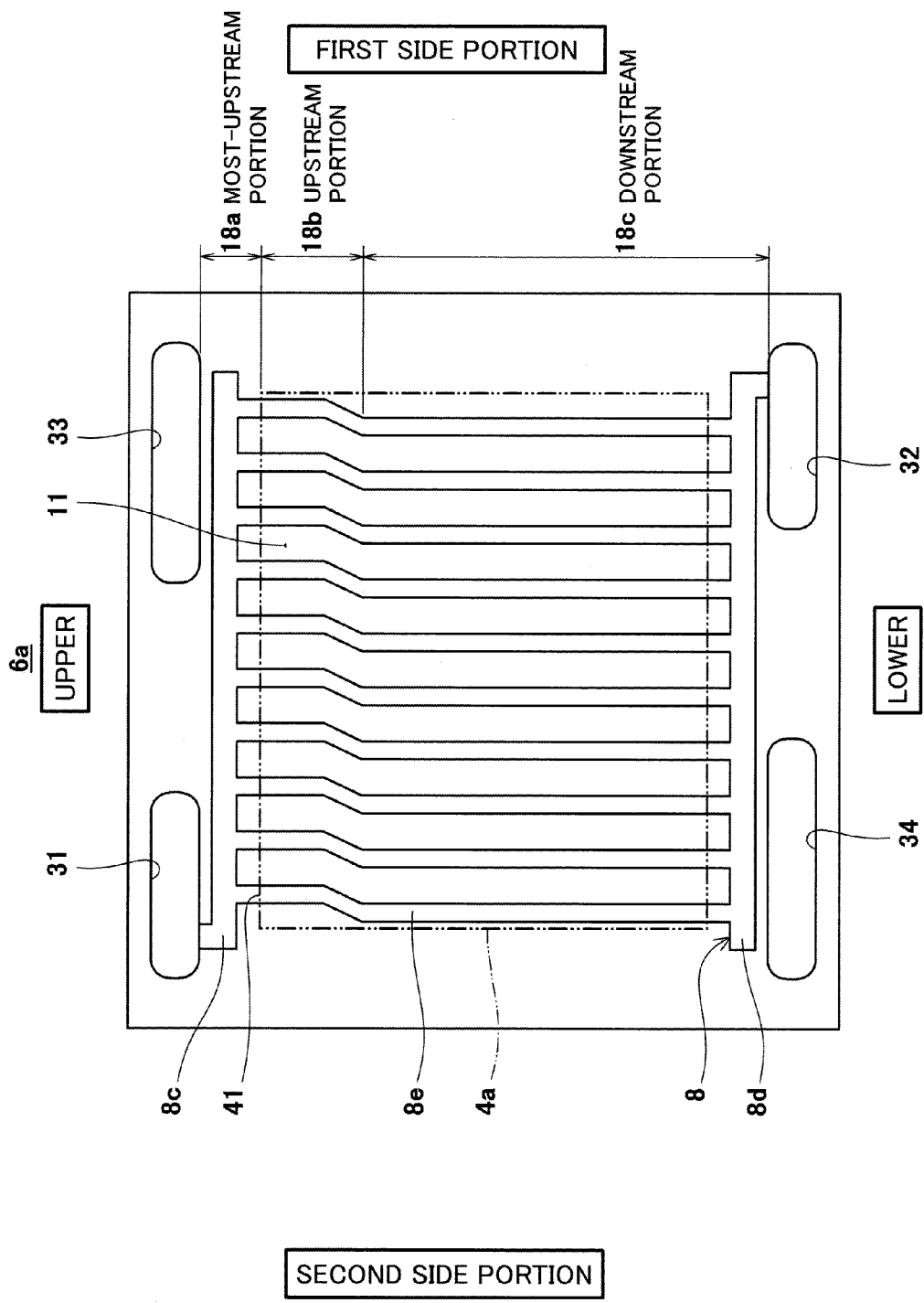
FIG. 19 is a schematic view showing a configuration of an inner surface of an anode separator of a fuel cell stack according to Embodiment 8 of the present invention.

FIG. 18 is a schematic view showing a configuration of an inner surface of a cathode separator of a fuel cell stack according to Embodiment 8 of the present invention. FIG. 19 is a schematic view showing a configuration of an inner surface of an anode separator of a fuel cell stack according to Embodiment 8 of the present invention. In FIG. 18, the upper and lower sides of the cathode separator are depicted as the upper and lower sides of FIG. 18, while in FIG. 19, the upper and lower sides of the anode separator are depicted as the upper and lower sides of FIG. 19. In FIGS. 18 and 19, the cooling medium supply manifold hole and the cooling medium discharge manifold hole are omitted.

As shown in FIGS. 18 and 19, the fuel cell stack 61 (fuel cell 100) according to Embodiment 8 of the present invention has basically the same configuration as that of the fuel cell stack 61 (fuel cell 100) according to Embodiment 1 but is different from the same in that the oxidizing gas channel 9 runs in a straight-line shape and the fuel gas channel 8 runs in a straight-line shape, and the positions of the manifold holes such as the fuel gas supply manifold hole 31 are different.

Firstly, the positions of the manifold holes such as the fuel gas supply manifold hole 31 in the cathode separator 6b will be described with reference to FIG. 18. Since the positions of the manifold holes such as the fuel gas supply manifold hole 31 in the anode separator 6a are similar to the positions of the manifold holes such as the fuel gas supply manifold hole 31 in the cathode separator 6b, they will not be described repetitively.

As shown in FIG. 18, at an upper portion of a first side portion of the cathode separator 6b, an oxidizing gas supply manifold hole 33 is provided, while at a lower portion thereof, the fuel gas exhaust manifold hole 32 is provided. At an upper portion of a second side portion of the cathode separator 6b, a fuel gas supply manifold hole 31 is provided, while at a lower portion thereof, an oxidizing gas exhaust manifold hole 34 is provided.

As shown in FIG. 18, the oxidizing gas channel 9 includes an upstream gas channel 9c, a downstream gas channel 9d and a plurality of communication gas channels 9e for providing communication between the upstream gas channel 9c and the downstream gas channel 9d. An upstream end of the upstream gas channel 9c is connected to the oxidizing gas supply manifold hole 33 and constitutes an upstream end of the oxidizing gas channel 9. The upstream gas channel 9c includes a vertically extending portion and a horizontally extending portion (from the first side portion toward the second side portion). A downstream end of the downstream gas channel 9d is connected to the oxidizing gas exhaust manifold hole 34 and constitutes a downstream end of the oxidizing gas channel 9. The downstream gas channel 9d includes a vertically extending portion and a horizontally extending portion (from the first side portion toward the second side portion). The communication gas channels 9e extend substantially in a straight-line shape in a vertical direction.

As shown in FIG. 19, like the oxidizing gas channel 9, the fuel gas channel 8 includes an upstream gas channel 8c, a downstream gas channel 8d and a plurality of communication gas channels 8e for providing communication between the upstream gas channel 8c and the downstream gas channel 8d. An upstream end of the upstream gas channel 8c is connected to the fuel gas supply manifold hole 31 and constitutes an upstream end of the fuel gas channel 8. The upstream gas channel 8c includes a vertically extending portion and a horizontally extending portion (from the second side portion toward the first side portion). A downstream end of the downstream gas channel 8d is connected to the fuel gas exhaust manifold hole 32 and constitutes a downstream end of the fuel gas channel 8. The downstream gas channel 8d includes a vertically extending portion and a horizontally extending portion (from the second side portion toward the first side portion). The communication gas channels 8e extend substantially in a straight-line shape (S-shape) in a vertical direction.

A configuration of the communication gas channels 8e in the fuel gas channel 8 will be described in detail with reference to FIG. 20.

Figure 20:
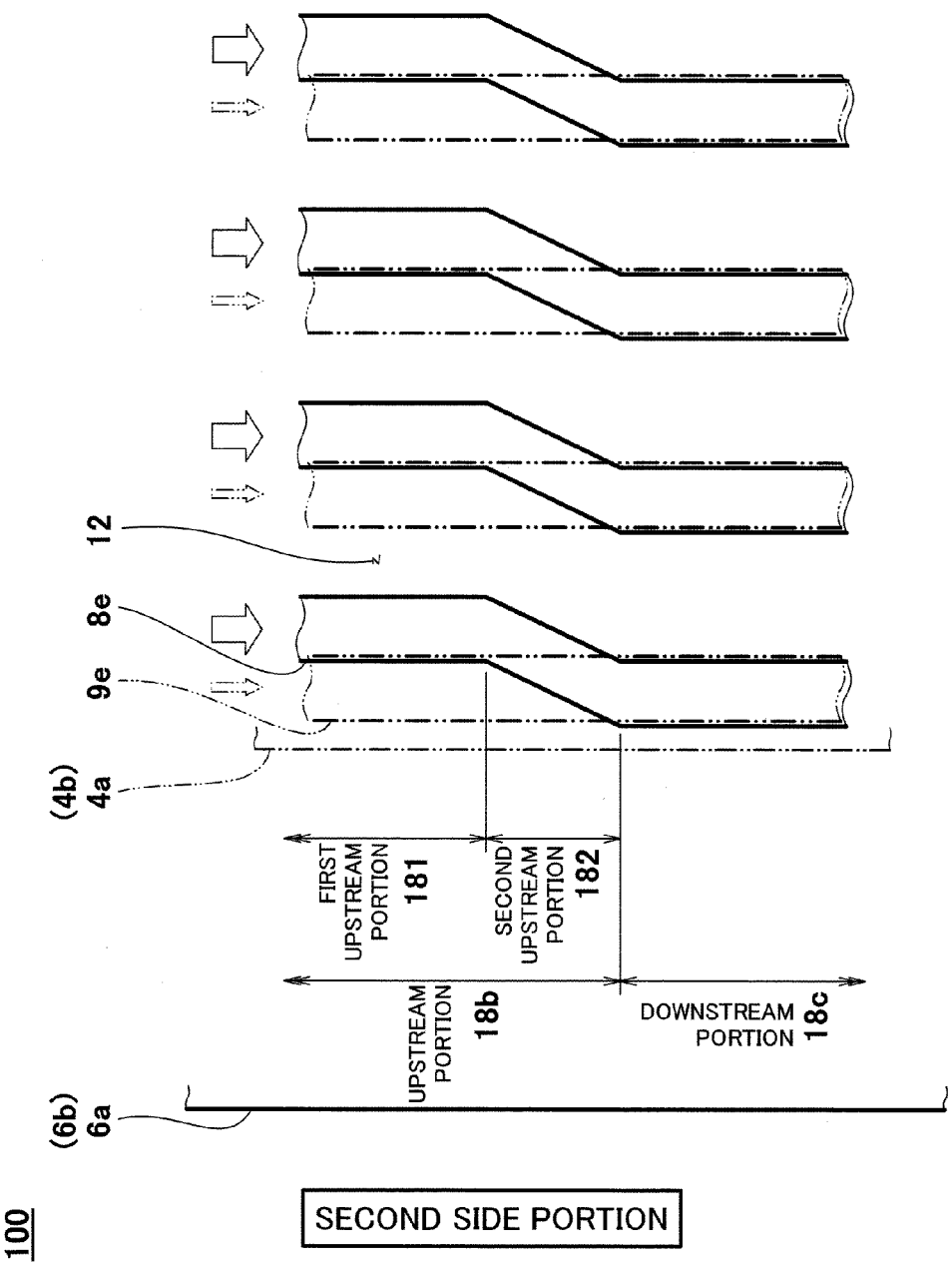
FIG. 20 is a schematic view showing a configuration of a fuel cell according to Embodiment 8 of the present invention.

FIG. 20 is a schematic view showing a configuration of a fuel cell 100 according to Embodiment 8. In FIG. 20, only a part of the fuel cell 100 is shown, and the anode separator 6a and the cathode separator 6b are perspectively drawn when viewed in a thickness direction of the fuel cell 100 (anode separator 6a). In FIG. 20, to allow the channels of the fuel gas channel 8 and the oxidizing gas channel 9 to be easily seen, horizontal positions of them are deviated from each other.

As shown in FIG. 20, each communication gas channel 8e of the fuel gas channel 8 includes a first upstream portion 181, a second upstream portion 182 and a downstream portion 18c. The communication gas channel 8e is formed such that the first upstream portion 181 overlaps with (faces) the second rib portion 12, when viewed in the thickness direction of the anode separator 6a. The second upstream portion 182 has a portion facing the second rib portion 12 (to be precise, to allow the fuel gas to flow in an oblique direction from the first side portion toward the second side portion). The downstream portion 18c overlaps with (faces) the communication gas channel 9e of the oxidizing gas channel 9.

The communication gas channel 8e of the fuel gas channel 8 is formed such that a ratio (first predetermined ratio) of the fuel gas channel width of the first upstream channel 181 to the second rib portion when viewed in the thickness direction of the anode separator 6a, is 1, while a ratio (second predetermined ratio) of the fuel gas channel width of the second upstream channel 182 to the second rib portion when viewed in the thickness direction of the anode separator 6a, is set smaller than the first predetermined ratio.

In the fuel cell stack 61 (fuel cell 100) according to Embodiment 8 configured as described above, advantages as those of the fuel cell stack 61 (fuel cell 100) according to Embodiment 1 can be achieved.

Embodiment 9

Figure 21:
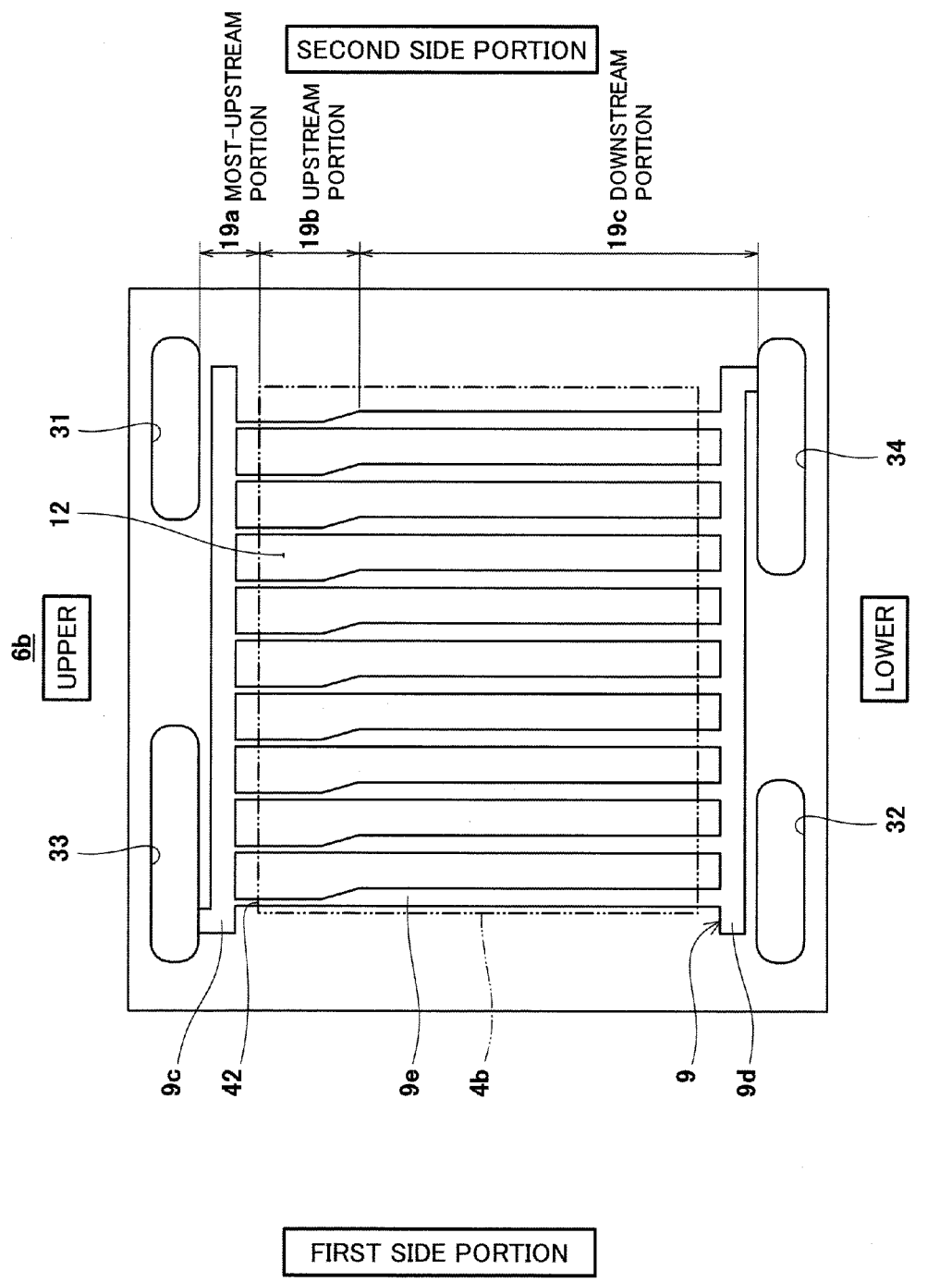
FIG. 21 is a schematic view showing a configuration of an inner surface of a cathode separator of a fuel cell stack according to Embodiment 9.
Figure 22:
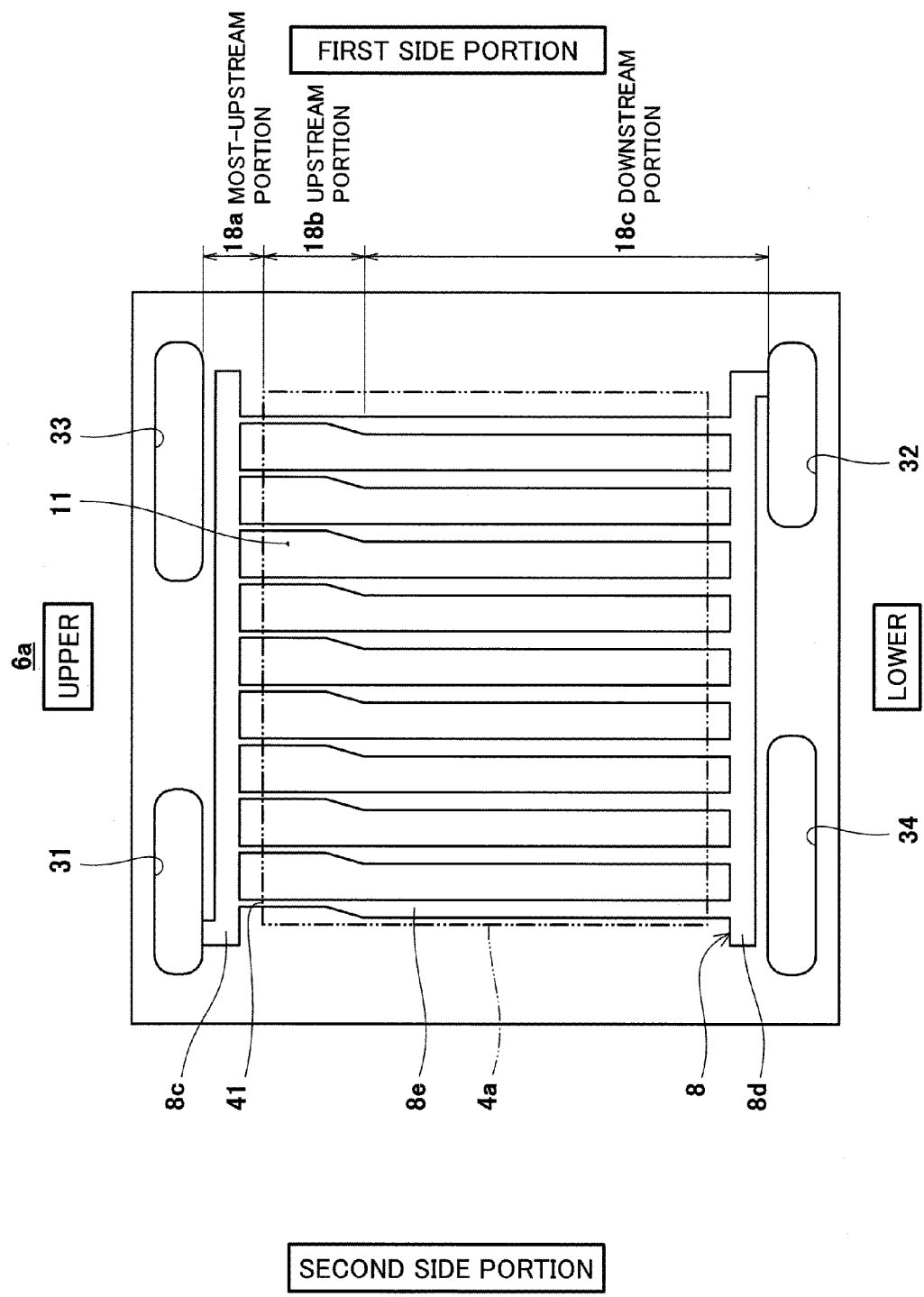
FIG. 22 is a schematic view showing a configuration of an inner surface of an anode separator of a fuel cell stack according to Embodiment 9 of the present invention.
Figure 23:
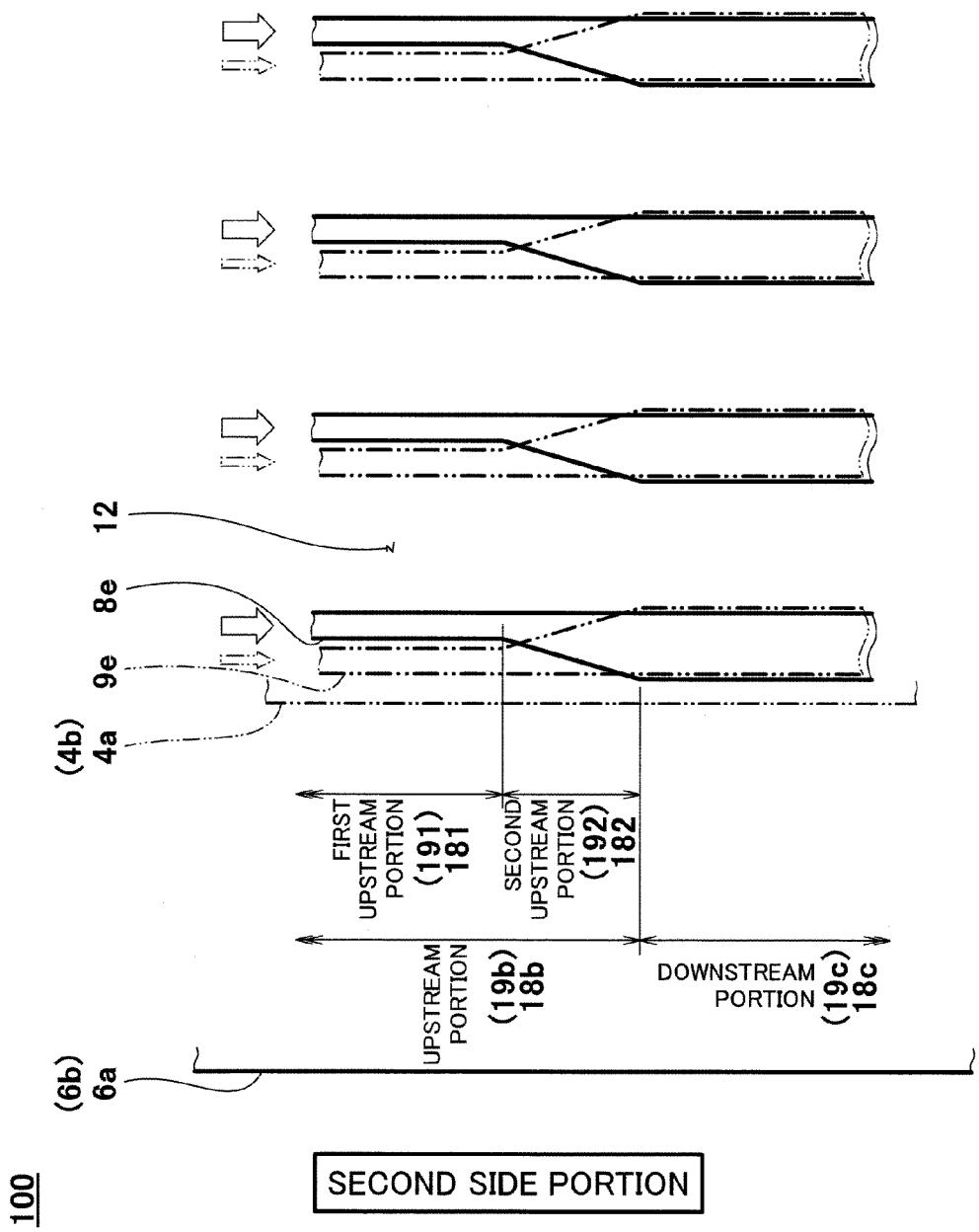
FIG. 23 is a schematic view showing a configuration of a fuel cell according to Embodiment 9 of the present invention.

FIG. 21 is a schematic view showing a configuration of an inner surface of a cathode separator of a fuel cell stack according to Embodiment 9 of the present invention. FIG. 22 is a schematic view showing a configuration of an inner surface of an anode separator of a fuel cell stack according to Embodiment 9 of the present invention. FIG. 23 is a schematic view showing a configuration of a fuel cell according to Embodiment 9 of the present invention. In FIG. 21, the upper and lower sides of the cathode separator are depicted as the upper and lower sides of FIG. 21, while in FIG. 22, the upper and lower sides of the anode separator are depicted as the upper and lower sides of FIG. 22. In FIGS. 21 and 22, the cooling medium supply manifold hole and the cooling medium discharge manifold hole are omitted. In FIG. 23, only a part of the fuel cell is shown, and the anode separator and the cathode separator are perspectively drawn when viewed in a thickness direction of the fuel cell (anode separator). In FIG. 23, to allow the channels of the fuel gas channel and the oxidizing gas channel to be easily seen, horizontal positions of them are deviated from each other.

As shown in FIGS. 21 to 23, the fuel cell stack 61 (fuel cell 100) according to Embodiment 9 of the present invention has basically the same configuration as that of the fuel cell stack 61 (fuel cell 100) according to Embodiment 8 but is different from the same in a configuration of the communication gas channel 9e of the oxidizing gas channel 9 and a configuration of the communication gas channel 8e of the fuel gas channel 8.

To be specific, the communication gas channel 9e of the oxidizing gas channel 9 includes a first upstream portion 191, a second upstream portion 192 and a downstream portion 19c.

The first upstream portion 191 may be a portion extending between the portion 42 which is one end and a portion satisfying a formula: L9<{(⅔)×L2} which is an opposite end, although its downstream end is different depending on a configuration such as a width of the oxidizing gas channel 9, a dew point of the reaction gas, a temperature of the cooling medium, etc. In the formula, L9 indicates a channel length of the first upstream portion 191 of the oxidizing gas channel 9, and L2 indicates an overall channel length of the oxidizing gas channel 9. The opposite end of the first upstream portion 191 is more preferably a portion satisfying a formula: L9≤L2 and most preferably a formula: L9≤{(⅓)×L2}.

The second upstream portion 192 may be a portion extending between the downstream end of the first upstream portion 191 which is one end and the portion satisfying a formula: L10≤{(⅔)≤L2} which is an opposite end, although its downstream end is different depending on a configuration such as a width of the oxidizing gas channel 9, a dew point of the reaction gas, a temperature of the cooling medium, etc. In the formula, L10 indicates a channel length of the second upstream portion 192 of the oxidizing gas channel 9, and L2 indicates an overall channel length of the oxidizing gas channel 9. The opposite end of the second upstream portion 192 is more preferably a portion satisfying a formula: L10≤L2 and most preferably a formula: L10≤{(⅓)×L2}.

The communication gas channel 9e of the oxidizing gas channel 9 is formed such that the first upstream portion 191 overlaps with (faces) the inner surface (first rib portion 11) of the anode separator 6a when viewed in the thickness direction of the anode separator 6a. In other words, the communication gas channel 9e of the oxidizing gas channel 9 is formed such that channel width of the first upstream portion 191 is smaller than the channel width of the downstream portion 18c, and is deviated toward the first side portion with respect to the communication gas channel 8e of the fuel gas channel 8.

A portion of the second upstream portion 192 faces the first rib portion 11. The downstream portion 19c overlaps with (faces) the communication gas channel 8e of the fuel gas channel 8.

Likewise, the first upstream portion 181 of the communication gas channel 8e of the fuel gas channel 8 overlaps with (faces) the second rib portion 12 when viewed in the thickness direction of the anode separator 6a. A portion of the second upstream portion 182 overlaps with the second rib portion 12. Furthermore, the downstream portion 19c overlaps with (faces) the communication gas channel 9e of the oxidizing gas channel 9e.

In the fuel cell stack 61 (fuel cell 100) according to Embodiment 9 configured as described above, advantages as those of the fuel cell stack 61 (fuel cell 100) according to Embodiment 8 can be achieved.

In Embodiment 9, in each of the communication gas channel 8e of the fuel gas channel 8 and the communication gas channel 9e of the oxidizing gas channel 9, a channel width from its upstream end to the downstream end of the second upstream portion 182 (192) is set to substantially a half of a channel width of the downstream portion 18c (19c) of the communication gas channel 8e (communication gas channel 9e).

Embodiment 10

Figure 24:
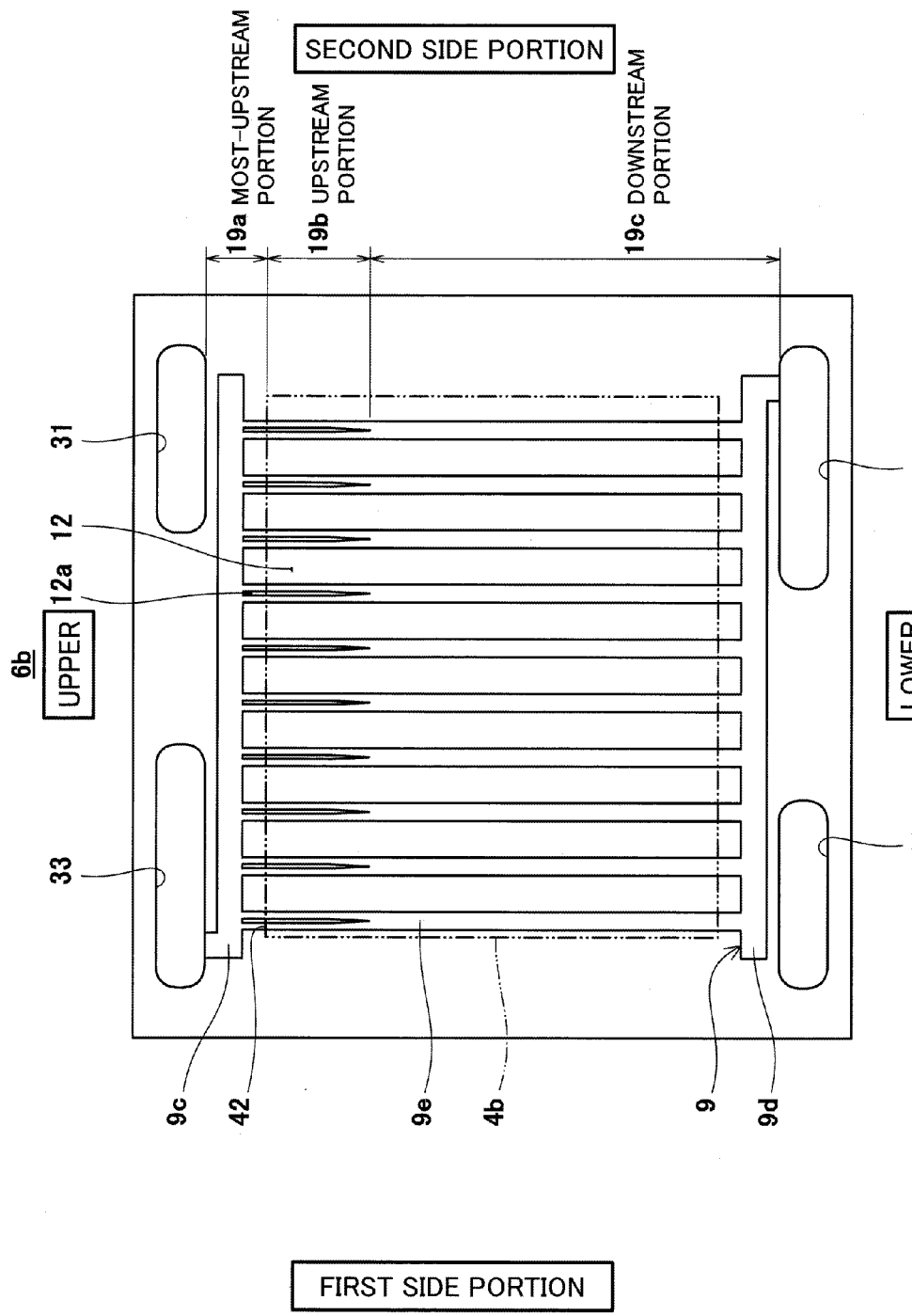
FIG. 24 is a schematic view showing a configuration of an inner surface of a cathode separator of a fuel cell stack according to Embodiment 10 of the present invention.
Figure 25:
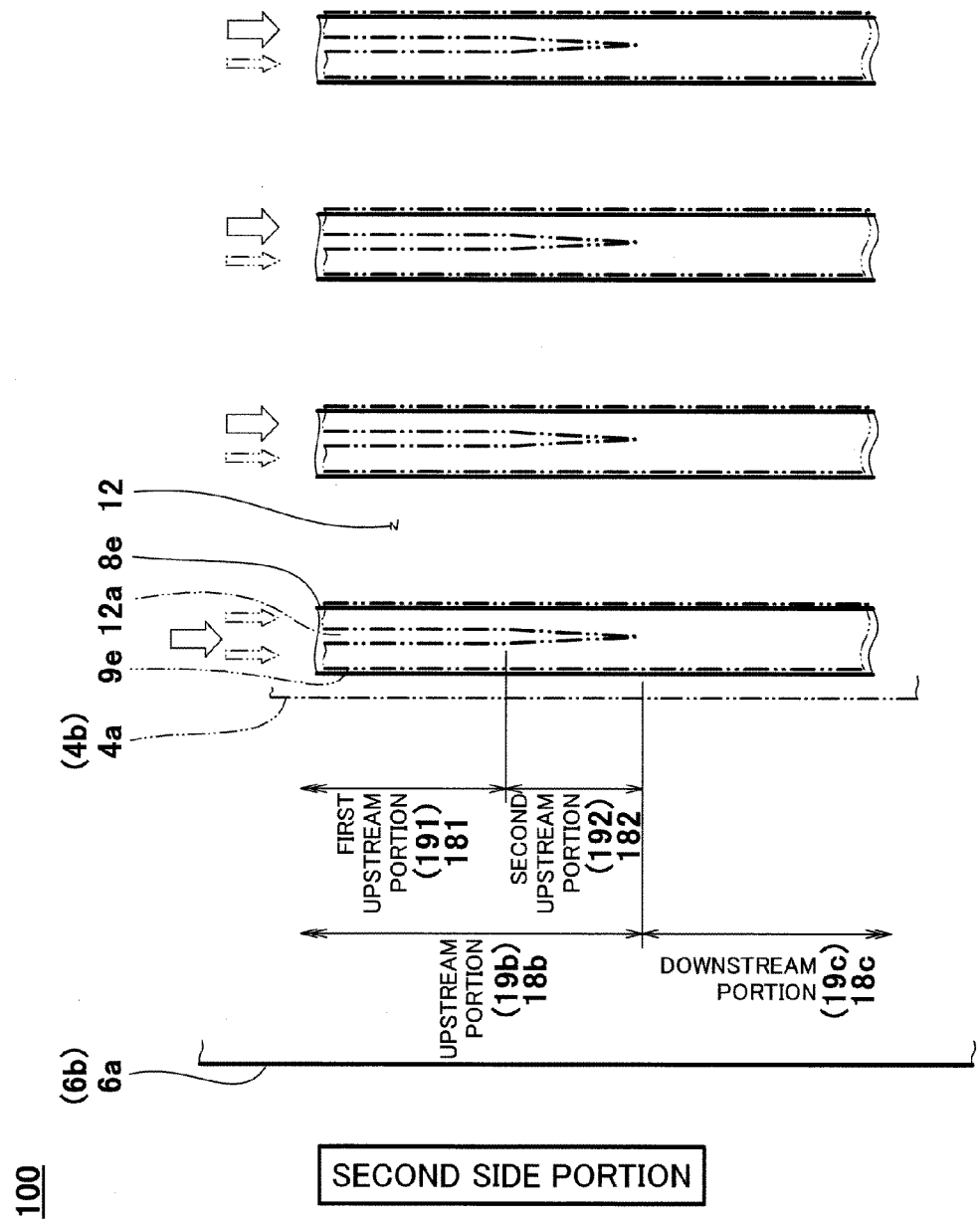
FIG. 25 is a schematic view showing a configuration of a fuel cell according to Embodiment 10 of the present invention.

FIG. 24 is a schematic view showing a configuration of an inner surface of a cathode separator of a fuel cell stack according to Embodiment 10 of the present invention. FIG. 25 is a schematic view showing a configuration of a fuel cell according to Embodiment 10 of the present invention. In FIG. 24, the upper and lower sides of the cathode separator are depicted as the upper and lower sides of FIG. 24, and the cooling medium supply manifold hole and the cooling medium discharge manifold hole are omitted. In FIG. 25, only a part of the fuel cell is shown, and the anode separator and the cathode separator are perspectively drawn when viewed in a thickness direction of the fuel cell (anode separator). In FIG. 25, to allow the channels of the fuel gas channel and the oxidizing gas channel to be easily seen, horizontal positions of them are deviated from each other.

As shown in FIGS. 24 and 25, the fuel cell stack 61 (fuel cell 100) according to Embodiment 10 of the present invention has basically the same configuration as that of the fuel cell stack 61 (fuel cell 100) according to Embodiment 8 but is different from the same in a configuration of the communication gas channel 9e of the oxidizing gas channel 9 and the fuel gas channel 8.

To be specific, the fuel gas channel 8 of the fuel cell stack 61 (fuel cell 100) according to Embodiment 10 is configured like the oxidizing gas channel 9 of the fuel cell stack 61 (fuel cell 100) according to Embodiment 8. In contrast, the communication gas channel 9e of the oxidizing gas channel 9 of the fuel cell stack 61 (fuel cell 100) according to Embodiment 10 is provided with a second rib portion 12a of an island shape extending vertically between its upstream end and a downstream end of the upstream portion 19b. The second rib portion 12a runs along the second rib portion 12. In Embodiment 10, the second rib portion 12a has a tapered (to be precise, triangle shape when viewed in the thickness direction of the anode separator 6a) lower end portion, and this tapered portion constitutes a second upstream portion 192.

As shown in FIG. 25, the communication gas channel 8e of the fuel gas channel 8 overlaps with (faces) the second rib portion 12a, when viewed in the thickness direction of the anode separator 6a, while the downstream portion 18c overlaps with (faces) communication gas channel 9e of the oxidizing gas channel 9, when viewed in the thickness direction of the anode separator 6a. Because of this, a ratio (hereinafter referred to as a ratio of a fuel gas channel width to the second rib portion 12a) of a widthwise portion of the upstream portion 18b of the fuel gas channel 8 which overlaps with the second rib portion 12a of the cathode separator 6b, when viewed in the thickness direction of the anode separator 6a, with respect to an overall width of the fuel gas channel 8 is larger than a ratio of a fuel gas channel width of the downstream portion 18c of the fuel gas channel 8 to the second rib portion 12a. In addition, a ratio of a fuel gas channel width of the first upstream portion 181 in the fuel gas channel 8 to the second rib portion 12a is larger than a ratio of a fuel gas channel width of the second upstream portion 182 in the fuel gas channel 8 to the second rib portion 12a.

In the fuel cell stack 61 (fuel cell 100) according to Embodiment 10 configured as described above, advantages as those of the fuel cell stack 61 (fuel cell 100) according to Embodiment 8 can be achieved.

Embodiment 11

Figure 26:
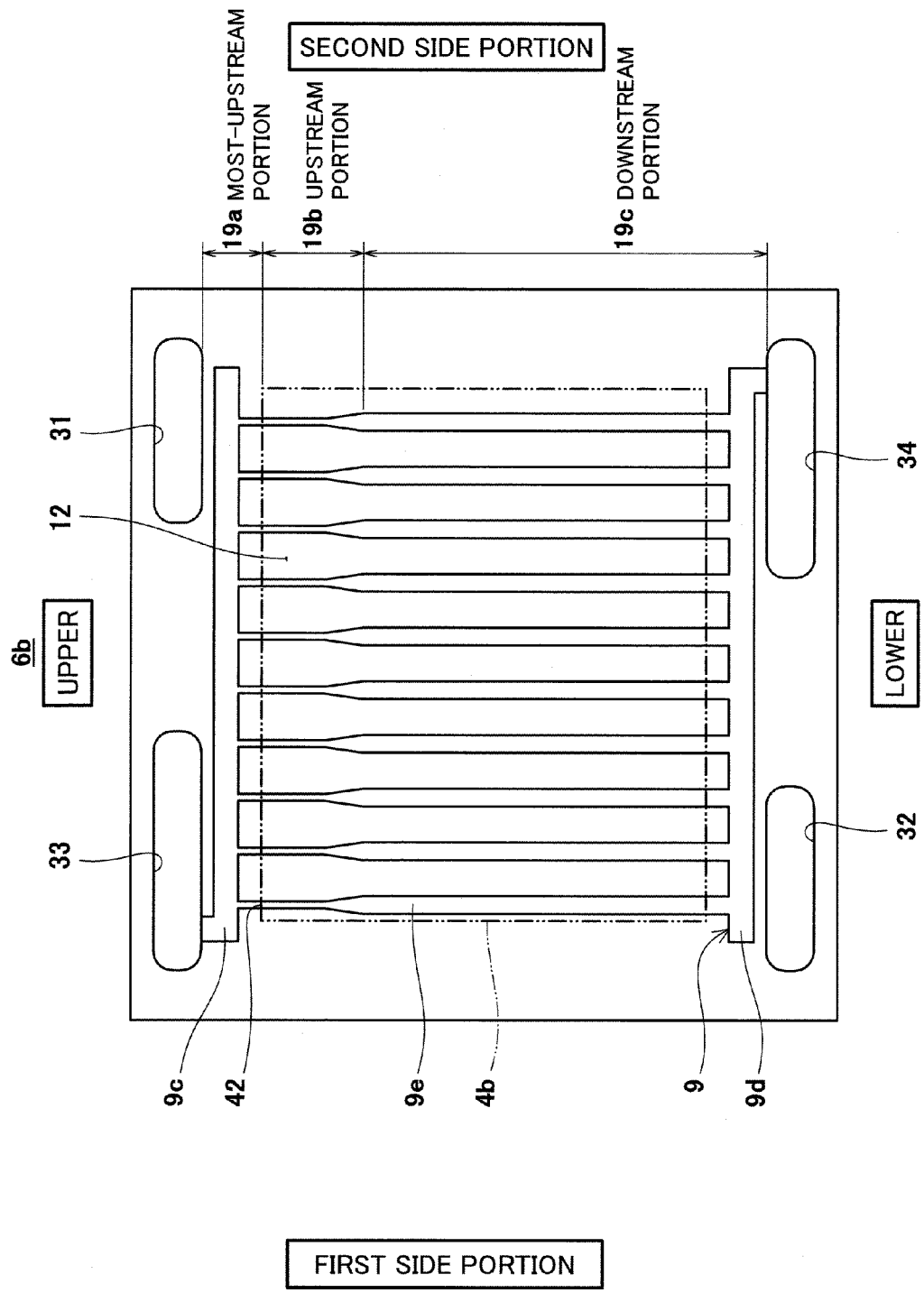
FIG. 26 is a schematic view showing a configuration of an inner surface of a cathode separator of a fuel cell stack according to Embodiment 11 of the present invention.
Figure 27:
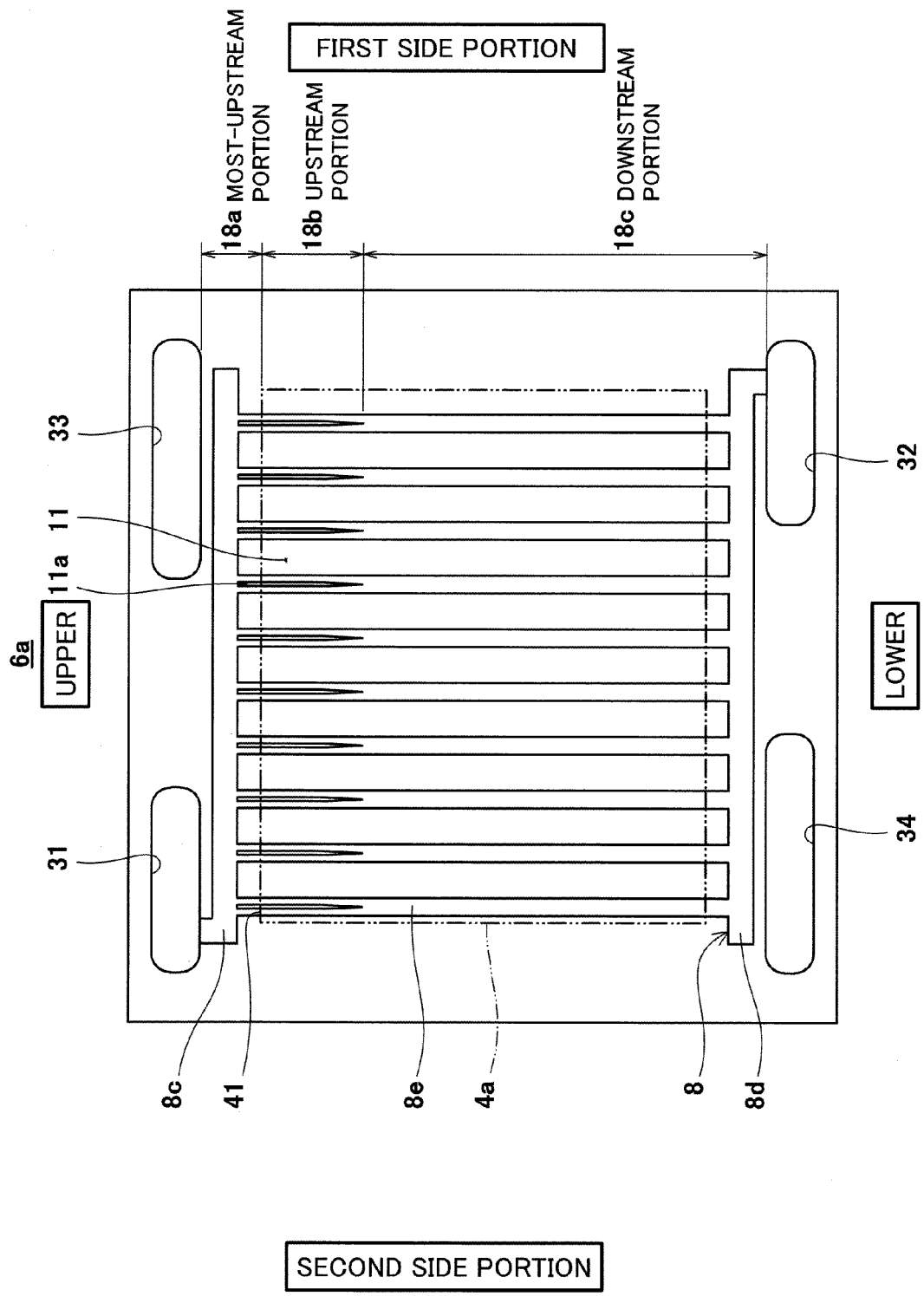
FIG. 27 is a schematic view showing a configuration of an inner surface of an anode separator of a fuel cell stack according to Embodiment 11 of the present invention.
Figure 28:
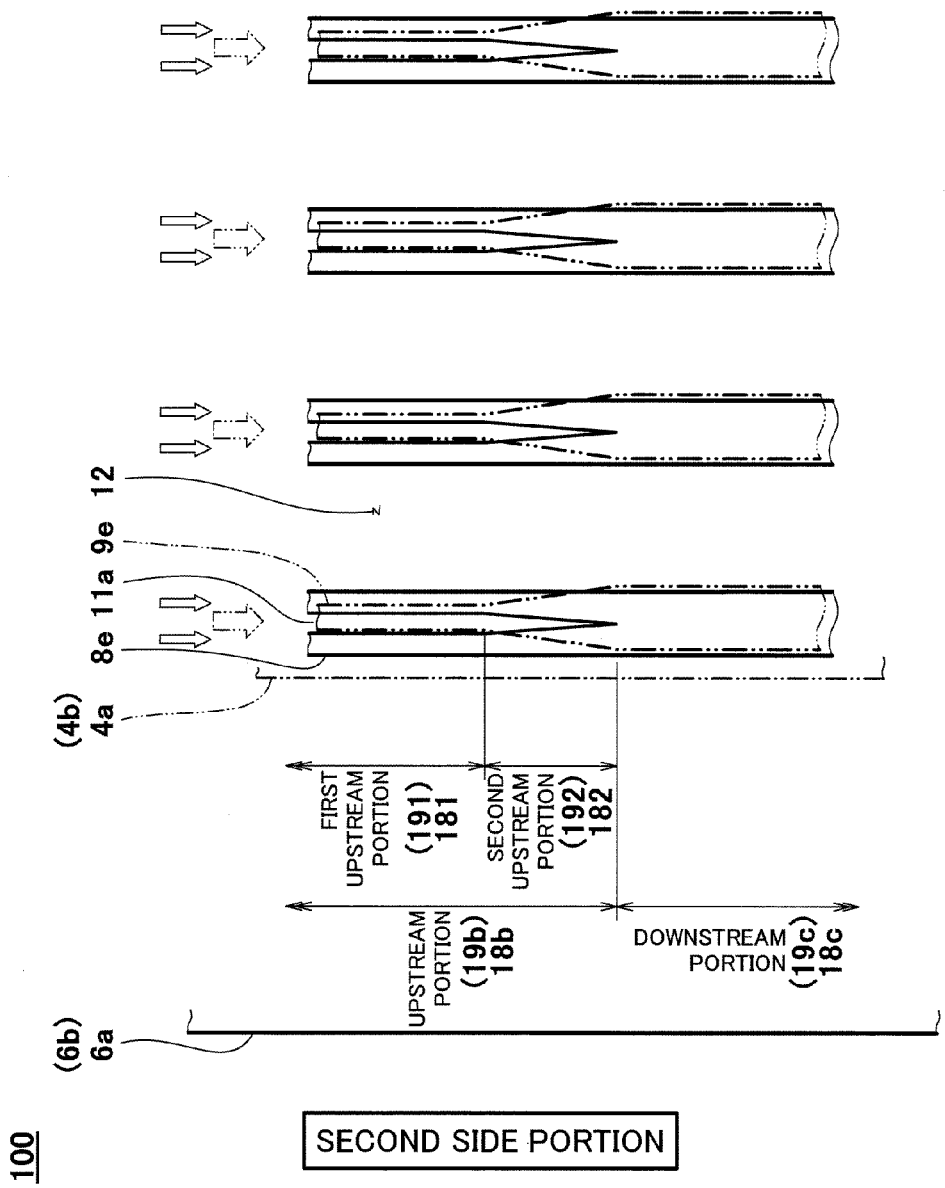
FIG. 28 is a schematic view showing a configuration of a fuel cell according to Embodiment 11 of the present invention.

FIG. 26 is a schematic view showing a configuration of an inner surface of a cathode separator of a fuel cell stack according to Embodiment 11 of the present invention. FIG. 27 is a schematic view showing a configuration of an inner surface of an anode separator of a fuel cell stack according to Embodiment 11 of the present invention. FIG. 28 is a schematic view showing a configuration of a fuel cell according to Embodiment 11 of the present invention. In FIG. 26, the upper and lower sides of the cathode separator are depicted as the upper and lower sides of FIG. 26, while in FIG. 27, the upper and lower sides of the anode separator are depicted as the upper and lower sides of FIG. 27. In FIGS. 26 and 27, the cooling medium supply manifold hole and the cooling medium discharge manifold hole are omitted. In FIG. 28, only a part of the fuel cell is shown, and the anode separator and the cathode separator are perspectively drawn when viewed in a thickness direction of the fuel cell (anode separator). In FIG. 28, to allow the channels of the fuel gas channel and the oxidizing gas channel to be easily seen, horizontal positions of them are deviated from each other.

As shown in FIGS. 26 to 28, the fuel cell stack 61 (fuel cell 100) according to Embodiment 11 of the present invention has basically the same configuration as that of the fuel cell stack 61 (fuel cell 100) according to Embodiment 8 but is different from the same in a configuration of the communication gas channel 9e of the oxidizing gas channel 9 and the fuel gas channel 8.

To be specific, the fuel gas channel 8 of the fuel cell stack 61 (fuel cell 100) according to Embodiment 11 is configured like the oxidizing gas channel 9 of the fuel cell stack 61 (fuel cell 100) according to Embodiment 10. In contrast, the communication gas channel 9e of the oxidizing gas channel 9 of the fuel cell stack 61 (fuel cell 100) according to Embodiment 11 is formed such that a portion extending from its upstream end to a downstream end of the first upstream portion 191 overlaps with (faces) a first rib portion 11a formed on an inner surface (within the communication gas channel 8e) of the fuel gas channel 8 of the anode separator 6a when viewed in the thickness direction of the anode separator 6a. The second upstream portion 192 of the communication gas channel 9e overlaps with (faces) a portion of the first rib portion 11a when viewed in the thickness direction of the anode separator 6a. Furthermore, the downstream portion 19c of the communication gas channel 9e overlaps with (faces) the downstream portion 18c of the communication gas channel 8e of the fuel gas channel 8 when viewed in the thickness direction of the anode separator 6a.

As shown in FIG. 28, a ratio of a fuel gas channel width of the upstream portion 18b of the fuel gas channel 8 to the second rib portion 12a is larger than a ratio of a fuel gas channel width of the downstream portion 18c of the fuel gas channel 8 to the second rib portion 12a. In addition, a ratio of a fuel gas channel width of the first upstream portion 181 of the fuel gas channel 8 to the second rib portion 12a is larger than a ratio of a fuel gas channel width of the second upstream portion 182 to the second rib portion 12a.

In the fuel cell stack 61 (fuel cell 100) according to Embodiment 11 configured as described above, advantages as those of the fuel cell stack 61 (fuel cell 100) according to Embodiment 8 can be achieved.

Although in Embodiment 11, the communication gas channel 9e of the oxidizing gas channel 9 overlaps with (faces) the first rib portion 11a, the present invention is not limited to this. Alternatively, a portion of the communication gas channel 9e may overlap with the first rib portion 11a, i.e., the communication gas channel 8e of the fuel gas channel 8e, so long as a ratio of a fuel gas channel width of the upstream portion 18b of the fuel gas channel 8 to the second rib portion 12a is larger than a ratio of a fuel gas channel width of the downstream portion 18c of the fuel gas channel 8 to the second rib portion 12a.

Embodiment 12

Figure 29:
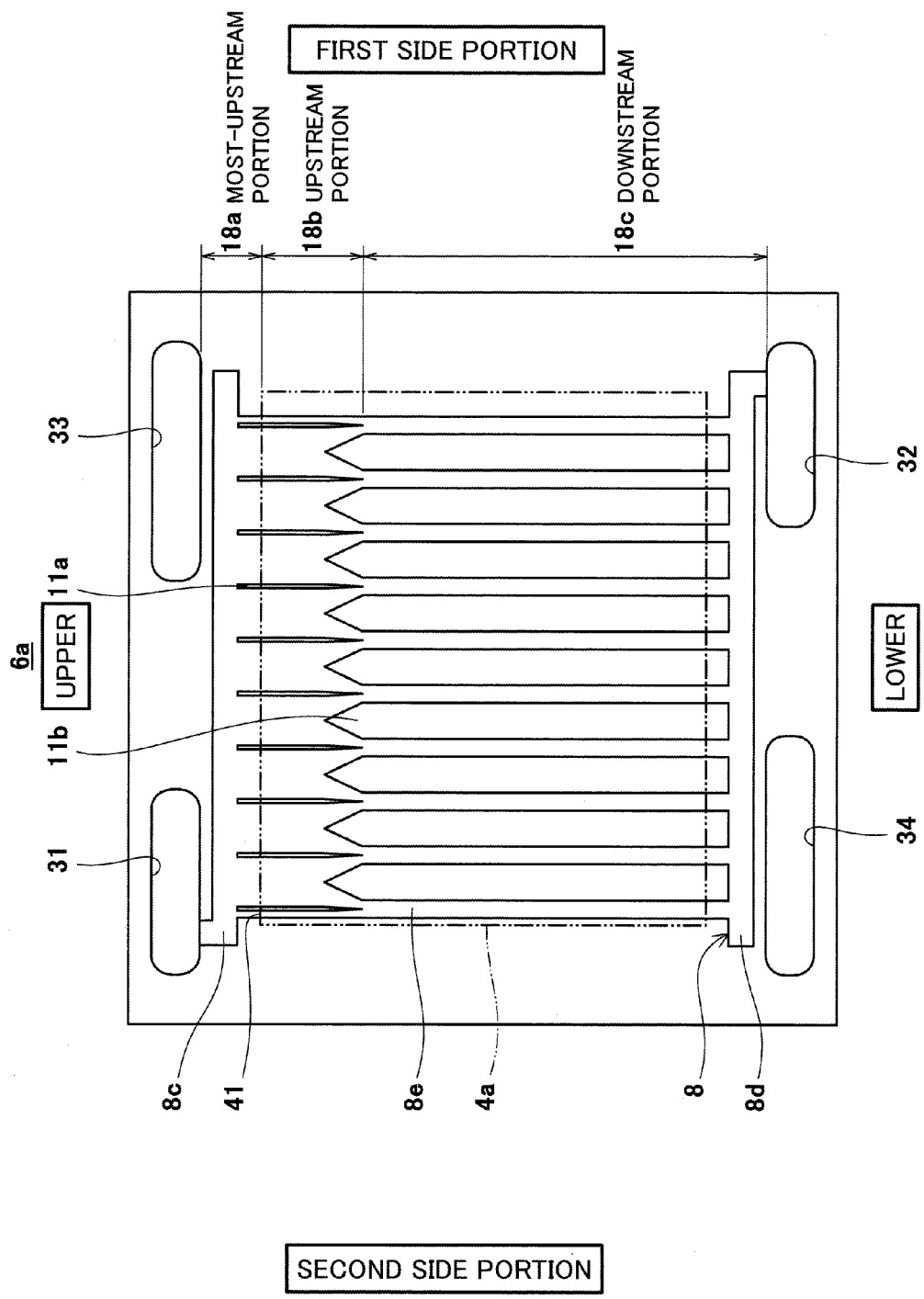
FIG. 29 is a schematic view showing a configuration of an inner surface of an anode separator of a fuel cell stack according to Embodiment 12 of the present invention.
Figure 30:
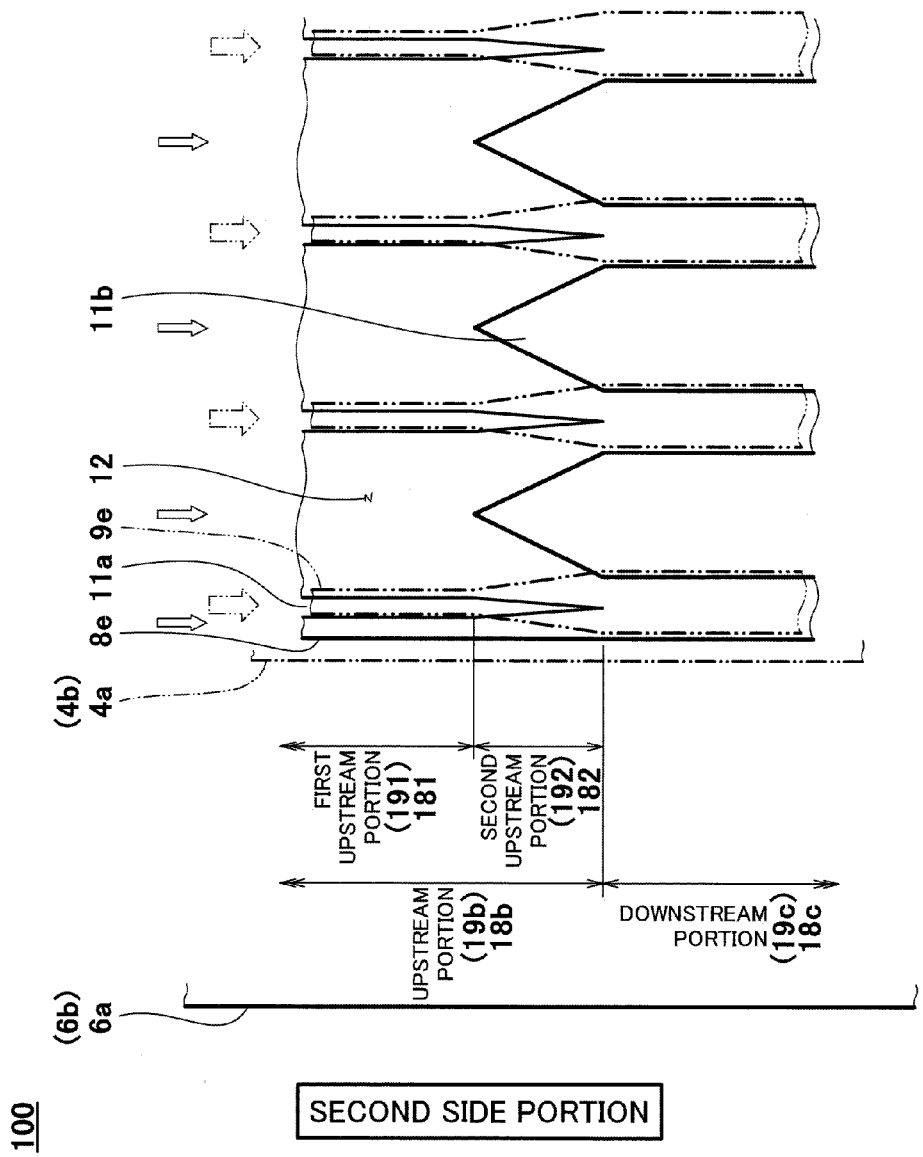
FIG. 30 is a schematic view showing a configuration of a fuel cell according to Embodiment 12 of the present invention.

FIG. 29 is a schematic view showing a configuration of an inner surface of an anode separator of a fuel cell stack according to Embodiment 12 of the present invention. FIG. 30 is a schematic view showing a configuration of a fuel cell according to Embodiment 12 of the present invention. In FIG. 29, the upper and lower sides of the anode separator are depicted as the upper and lower sides of FIG. 29, and the cooling medium supply manifold hole and the cooling medium discharge manifold hole are omitted. In FIG. 30, only a part of the fuel cell is shown, and the anode separator and the cathode separator are perspectively drawn when viewed in a thickness direction of the fuel cell (anode separator). In FIG. 30, to allow the channels of the fuel gas channel and the oxidizing gas channel to be easily seen, horizontal positions of them are deviated from each other.

As shown in FIGS. 29 and 30, the fuel cell stack 61 (fuel cell 100) according to Embodiment 12 of the present invention has basically the same configuration as that of the fuel cell stack 61 (fuel cell 100) according to Embodiment 11 but is different from the same in a configuration of the communication gas channel 8e of the fuel gas channel 8.

To be specific, the communication gas channel 8e of the fuel gas channel 8 of the fuel cell stack 61 (fuel cell 100) according to Embodiment 12 includes a recess 80 which provides communication between a downstream end of an upstream gas channel 8c and an upstream end of a downstream gas channel 8d, and a plurality of first rib portions 11a and first rib portions 11b which are like island and uprise from a bottom surface of the recess 80.

The recess 80 has a substantially rectangular shape when viewed in the thickness direction of the anode separator 6a. The first rib portion 11a extends vertically between an upstream end of the communication gas channel 8e and a downstream end of the upstream portion 18b and has a tapered (to be precise, triangle shape when viewed in the thickness direction of the anode separator 6a) lower end portion. The plurality of first rib portions 11a run along each other.

The first rib portion 11b extends vertically between an upstream end of the second upstream portion 182 of the communication gas channel 8e and a downstream end of the second upstream portion 182. The plurality of first rib portions 11b run along each other. Each of the first rib portions 11b is positioned between adjacent first rib portions 11a in a flow direction of the fuel gas.

As shown in FIG. 30, the communication gas channel 8e of the fuel gas channel 8 overlaps with (faces) the second rib portion 12a when viewed in the thickness direction of the anode separator 6a, while the downstream portion 18c overlaps with (faces) the communication gas channel 9e of the oxidizing gas channel 9, when viewed in the thickness direction of the anode separator 6a. Because of this, a ratio of a fuel gas channel width of the upstream portion 18b of the fuel gas channel 8 to the second rib portion 12a is larger than a ratio of a fuel gas channel width of the downstream portion 18c of the fuel gas channel 8 to the second rib portion 12a. In addition, a ratio of a fuel gas channel width of the first upstream portion 181 of the fuel gas channel 8 to the second rib portion 12a is larger than a ratio of a fuel gas channel width of the second upstream portion 182 to the second rib portion 12a.

In the fuel cell stack 61 (fuel cell 100) according to Embodiment 12 configured as described above, advantages as those of the fuel cell stack 61 (fuel cell 100) according to Embodiment 11 can be achieved.

Although in the fuel cell stacks 61 (fuel cells 100) according to Embodiment 1 to embodiment 7, the channel of the fuel gas channel 8 is formed by a single groove and the channel of the oxidizing gas channel 9 is formed by a single groove, the present invention is not limited to this. Alternatively, each of the channel of the fuel gas channel 8 and the channel of the oxidizing gas channel 9 may be formed by plural grooves.

Although in the fuel cell stacks 61 (fuel cells 100) according to Embodiment 1 to embodiment 12, an entire range of the channel of the upstream portion 18*b* of the fuel gas channel 8 overlaps with the second rib portion 12 of the cathode separator 12 in a direction in which the channel extends (fuel gas flows), a portion of the range in the direction in which the channel extends may be configured not to overlap with the second rib portion 12.

The upstream portion 18*b* of the fuel gas channel 8 and the upstream portion 19*b* of the oxidizing gas channel 9 in each of the fuel cell stacks 61 (fuel cells 100) according to Embodiments 1 to 7 may be configured like the upstream portion 18*b* of the fuel gas channel 8 and the upstream portion 19*b* of the oxidizing gas channel 9 in each of the fuel cell stacks 61 (fuel cells 100) according to Embodiments 9 to 12.

Although in each of the fuel cell stacks 61 (fuel cells 100) according to Embodiments 1 to 11, the first separator is the anode separator 6*a*, the second separator is the cathode separator 6*b*, the first reaction gas channel is the fuel gas channel 8, and the second reaction gas channel is the oxidizing gas channel 9, the present invention is not limited to this, but the first separator may be the cathode separator 6*b*, the second separator may be the anode separator 6*a*, the first reaction gas channel may be the oxidizing gas channel 9, and the second reaction gas channel may be the fuel gas channel 8. With this configuration, similar advantages are achieved.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

A polymer electrolyte fuel cell and a fuel cell stack of the present invention are useful as a polymer electrolyte fuel cell and a fuel cell stack which are capable of suppressing a polymer electrolyte membrane from getting dried and thereby suppressing a polymer electrolyte membrane from being degraded when they are operated under conditions of a high-temperature and a low humidity.

REFERENCE SIGNS LISTS

1 polymer electrolyte membrane
2*a* anode catalyst layer
2*b* cathode catalyst layer
3*a* anode gas diffusion layer
3*b* cathode gas diffusion layer
4*a* anode
4*b* cathode
5 MEA (membrane-electrode-assembly)
6*a* anode separator
6*b* cathode separator
7 gasket
8 fuel gas channel (first reaction gas channel)
8*a* reciprocating portion (horizontal portion)
8*b* inverted portion (vertical portion)
8*c* upstream gas channel
8*d* downstream gas channel
8*e* communication gas channel
9 oxidizing gas channel (second reaction gas channel)
9*a* reciprocating portion (horizontal portion)
9*b* inverted portion (vertical portion)
9*c* upstream gas channel
9*d* downstream gas channel
9*e* communication gas channel
10 cooling medium channel
11 first rib portion
11*a* first rib portion
11*b* first rib portion
12 second rib portion
12*a* second rib portion
18*a* most-upstream portion
18*b* upstream portion
18*c* downstream portion
19*a* most-upstream portion
19*b* upstream portion
19*c* downstream portion
31 fuel gas supply manifold hole (first reaction gas supply manifold hole)
32 fuel gas exhaust manifold hole
33 oxidizing gas supply manifold hole (second reaction gas supply manifold hole)
34 oxidizing gas exhaust manifold hole
35 cooling medium supply manifold hole
36 cooling medium discharge manifold hole
41 portion
42 portion
61 fuel cell stack
62 cell stack body
63 first end plate
64 second end plate
80 recess
100 polymer electrolyte fuel cell
131 fuel gas supply manifold
132 fuel gas exhaust manifold
133 oxidizing gas supply manifold
134 oxidizing gas exhaust manifold
135 cooling medium supply manifold
136 cooling medium discharge manifold
181 first upstream portion
182 second upstream portion
191 first upstream portion
192 second upstream portion
202 electrode
202A portion
202B portion
203 reaction gas channel
204 rib portion

The invention claimed is:

1. A polymer electrolyte fuel cell comprising:
a membrane-electrode assembly including a polymer electrolyte membrane and electrodes including a first electrode and a second electrode and sandwiching a portion of the polymer electrolyte membrane which is inward relative to a peripheral portion of the polymer electrolyte membrane;
an electrically-conductive first separator which is of a plate shape and is provided in contact with the first electrode of the membrane-electrode assembly; and
an electrically-conductive second separator which is of a plate shape and is provided in contact with the second electrode of the membrane-electrode assembly, wherein:
the first separator is provided with a first reaction gas channel on one main surface of the first separator which contacts the first electrode such that a plurality of first rib portions run along each other, the second separator is provided with a second reaction gas channel on one main surface of the second separator which contacts the second electrode such that a plurality of second rib portions run along each other, the electrodes include catalyst layers disposed on main surfaces of the polymer electrolyte membrane, respectively, the first reaction gas channel includes an upstream portion and a downstream portion, the upstream portion being a predetermined length portion extending from a meeting point where the first reaction gas channel first contacts the first electrode from an upstream end of the first reaction gas channel toward a downstream side, and the downstream portion being a remaining portion of the first reaction gas channel other than the upstream portion, an overlap ratio of the first reaction gas channel to the plurality of second rib portions in the upstream portion is set larger that an overlap ratio of the first reaction gas channel to the plurality of second rib portions in the downstream portion, the overlap ratio of the first reaction gas channel to the plurality of second rib portions being a ratio of a width of the first reaction gas channel overlapping with one or more of the plurality of the second rib portions to an entire width of the first reaction gas channel, when viewed in a thickness direction of the first separator, the first reaction gas channel includes reciprocating portions and inverted portions connecting adjacent reciprocating portions, and the upstream portion of the first reaction gas channel extends from the meeting point to a most upstream inverted portion and includes a most upstream reciprocating portion.

2. The polymer electrolyte fuel cell according to claim 1, wherein the overlap ratio of the upstream portion of the first reaction gas channel is not less than ½ and not more than 1.

3. The polymer electrolyte fuel cell according to claim 1, wherein the overlap ratio of the upstream portion of the first reaction gas channel is 1.

4. The polymer electrolyte fuel cell according to claim 1, wherein the overlap ratio of the downstream portion of the first reaction gas channel is 0.

5. The polymer electrolyte fuel cell according to claim 1, wherein the first rib portion formed in the downstream portion of the first reaction gas channel overlaps with the second rib portion, when viewed in the thickness direction of the first separator.

6. The polymer electrolyte fuel cell according to claim 1, wherein:
a groove-shaped cooling medium channel is provided on at least one of the other main surface of the first separator and the other main surface of the second separator, and
a dew point of the first reaction gas flowing through the first reaction gas channel and a dew point of the second reaction gas flowing through the second reaction gas channel are lower than a temperature of a cooling medium flowing through the cooling medium channel.

7. The polymer electrolyte fuel cell according to claim 1, wherein at least one of the first reaction gas channel and the second reaction gas channel has a serpentine shape.

8. The polymer electrolyte fuel cell according to claim 1, wherein at least one of the first reaction gas channel and the second reaction gas channel has a spiral shape.

9. The polymer electrolyte fuel cell according to claim 1, wherein the first reaction gas channel and the second reaction gas channel form a parallel flow.

10. The polymer electrolyte fuel cell according to claim 9, wherein the first separator is provided with a first reaction gas supply manifold hole penetrating in a thickness direction thereof and the second separator is provided with a second reaction gas supply manifold hole penetrating in a thickness direction thereof such that the first reaction gas supply manifold hole and the second reaction gas supply manifold hole face each other.

11. The polymer electrolyte fuel cell according to claim 1, wherein a width of the upstream portion of the first reaction gas channel is smaller than a width of the downstream portion of the first reaction gas channel.

12. A fuel cell stack including a plurality of polymer electrolyte fuel cells each of which is recited in claim 1, the plurality of polymer electrolyte fuel cells being stacked together and fastened together.

13. The polymer electrolyte fuel cell according to claim 1, wherein the upstream portion of the first reaction gas channel extends from the meeting point to a second most upstream inverted portion and includes the most upstream reciprocating portion and a second most upstream reciprocating portion.

14. A polymer electrolyte fuel cell comprising:
a membrane-electrode assembly including a polymer electrolyte membrane and electrodes including a first electrode and a second electrode and sandwiching a portion of the polymer electrolyte membrane which is inward relative to a peripheral portion of the polymer electrolyte membrane;
an electrically-conductive first separator which is of a plate shape and is provided in contact with the first electrode of the membrane-electrode assembly; and
an electrically-conductive second separator which is of a plate shape and is provided in contact with the second electrode of the membrane-electrode assembly, wherein:
the first separator is provided with a first reaction gas channel on one main surface of the first separator which contacts the first electrode such that a plurality of first rib portions run along each other,
the second separator is provided with a second reaction gas channel on one main surface of the second separator which contacts the second electrode such that a plurality of second rib portions run along each other,
the electrodes include catalyst layers disposed on main surfaces of the polymer electrolyte membrane, respectively,
at least the first reaction gas channel includes an upstream gas channel, a downstream gas channel and a plurality of communication gas channels which provide fluid communication between the upstream gas channel and the downstream gas channel,
at least one of the plurality of communication gas channels includes an upstream portion and a downstream portion, the upstream portion being a predetermined length portion extending from a meeting point where the at least one of the plurality of communication gas channels first contacts the first electrode from the upstream gas channel toward the downstream gas channel, and the downstream portion being a remaining portion of the at least one of the plurality of communication gas channels other than the upstream portion,
an overlap ratio of the first reaction gas channel to the plurality of second rib portions in the upstream portion is set larger that an overlap ratio of the first reaction gas channel to the plurality of second rib portions in the downstream portion, the overlap ratio of the first reaction gas channel to the plurality of second rib portions being a ratio of a width of the at least one of the plurality of communication gas channels overlapping with one or more of the plurality of the second rib portions to an entire width of the at least one of the plurality of communication gas channels, when viewed in a thickness direction of the first separator, the first reaction gas channel includes reciprocating portions and inverted portions connecting adjacent reciprocating portions, and the upstream portion of the first reaction gas channel extends from the meeting point to a most upstream inverted portion and includes a most upstream reciprocating portion.

* * * * *